(12) United States Patent
Wang et al.

(10) Patent No.: US 12,294,550 B2
(45) Date of Patent: May 6, 2025

(54) TECHNIQUES FOR COMMUNICATING CHANNEL STATE INFORMATION FOR ENERGY TRANSFER OPERATIONS

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Fairless Hills, PA (US)

(73) Assignee: Qualcomm Incorporated, San Diego, CA (US)

( * ) Notice: Subject to any disclaimer, the term of this patent is extended or adjusted under 35 U.S.C. 154(b) by 635 days.

(21) Appl. No.: 17/683,902

(22) Filed: Mar. 1, 2022

(65) Prior Publication Data
US 2023/0283442 A1    Sep. 7, 2023

(51) Int. Cl.
*H04L 5/00* (2006.01)
*H02J 50/20* (2016.01)
*H02J 50/80* (2016.01)

(52) U.S. Cl.
CPC .................................. *H04L 5/0057* (2013.01)

(58) Field of Classification Search
CPC ......... H04L 5/0057; H02J 50/20; H02J 50/40; H02J 50/80
See application file for complete search history.

(56) References Cited

U.S. PATENT DOCUMENTS

| 8,469,122 | B2 | 6/2013 | Perlman et al. | |
|---|---|---|---|---|
| 2015/0303741 | A1* | 10/2015 | Malik | H02J 50/001 307/104 |
| 2017/0180075 | A1* | 6/2017 | Gollakota | H02J 50/001 |
| 2019/0020530 | A1* | 1/2019 | Au | H04W 72/21 |
| 2019/0044392 | A1* | 2/2019 | Chowdhury | H02J 7/007 |
| 2021/0288755 | A1* | 9/2021 | Abedi | H04L 1/1678 |
| 2024/0163840 | A1* | 5/2024 | Säily | H04L 5/0053 |

FOREIGN PATENT DOCUMENTS

KR    102090760 B1    3/2020

OTHER PUBLICATIONS

International Search Report and Written Opinion—PCT/US2023/013075—ISA/EPO—May 12, 2023.

* cited by examiner

*Primary Examiner* — Kent Krueger
(74) *Attorney, Agent, or Firm* — Holland & Hart LLP

(57) ABSTRACT

Methods, systems, and devices for wireless communications are described. An energy transmitter device may transmit an energy signal to an energy receiver device for energy harvesting by the energy receiver device. To communicate channel state information (CSI) of a channel between the energy transmitter device and the energy receiver device, the energy transmitter device may transmit a first signal to the energy receiver device. In response, the energy receiver device may transmit a second signal to the energy transmitter device that is indicative of the CSI, where the CSI is based on the first signal. The energy transmitter device may transmit additional signals to the energy receiver device whose transmission characteristics are based on the CSI.

30 Claims, 22 Drawing Sheets

TECHNIQUES FOR COMMUNICATING CHANNEL STATE INFORMATION FOR ENERGY TRANSFER OPERATIONS

FIELD OF TECHNOLOGY

The following relates to wireless communications, including techniques for communicating channel state information (CSI) for energy transfer operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support communications between an energy transmitter device and an energy receiver device. The energy receiver device may harvest energy from an energy signal transmitted by the energy transmitter device in order to process signals received from the energy transmitter device and transmit signals to the energy transmitter device. In some cases, however, a communication range between the energy transmitter device and the energy receiver device, for example, may be limited due to a limited amount of power that may be harvested from the energy signal.

SUMMARY

The described techniques relate to improved methods, systems, devices, and apparatuses that support techniques for communicating channel state information (CSI) for energy transfer operations. Generally, the described techniques enable the communication of CSI between an energy transmitter device and an energy receiver device. For example, the energy transmitter device may be configured to transmit, during energy harvesting intervals, an energy signal to the energy receiver device via a channel over which the energy transmitter device and the energy receiver device may communicate. The energy receiver device may receive the energy signal and harvest energy (e.g., power) from the energy signal to power one or more components of the energy receiver device. To communicate CSI between the energy transmitter device and the energy receiver device, the energy transmitter device may transmit a probing signal to the energy receiver device, for example, using a set of beamforming weights, a set of precoding parameters, or a combination thereof. Based on the probing signal, the energy receiver device may transmit a feedback signal to the energy transmitter device (e.g., using energy harvested from the energy signal) that is indicative of the CSI. For example, the energy receiver device may reflect the probing signal back to the energy transmitter device and a measurement of the reflected probing signal may be indicative of the CSI. Alternatively, the energy receiver device may determine the CSI based on measuring the probing signal and modulate and reflect an energy signal received after the probing signal to indicate the CSI. Alternatively, the energy receiver device may transmit a feedback message that includes the CSI using a waveform indicated by the energy transmitter device.

In response to receiving the feedback signal, the energy transmitter device may determine the CSI and transmit additional signals to the energy receiver device based on the CSI. For example, the energy transmitter device may transmit additional probing signals for the communication of additional CSI, additional energy signals, or data, among other signals, where the transmission characteristics of the additional signals are based on the CSI (e.g., transmitted using a beam or a set of pre-coding parameters that are based on the CSI). Communicating signals based on CSI may support increased communication range, increased communication reliability, and improved power harvesting, among other benefits, for example, by enabling beamforming and improved precoding parameter selection for communications between the energy transmitter device and the energy receiver device.

A method for wireless communication at an energy transmitter device is described. The method may include transmitting an energy signal to an energy receiver device via a channel, the energy signal providing energy from the energy transmitter device for energy harvesting at the energy receiver device during one or more energy harvesting intervals, transmitting, to the energy receiver device, a first signal, receiving, from the energy receiver device, a second signal from which the energy transmitter device determines CSI of the channel, the CSI based on the first signal, and transmitting, to the energy receiver device, one or more additional signals whose transmission characteristics are based on the CSI.

An apparatus for wireless communication at an energy transmitter device is described. The apparatus may include a processor, memory coupled with the processor, and instructions stored in the memory. The instructions may be executable by the processor to cause the apparatus to transmit an energy signal to an energy receiver device via a channel, the energy signal providing energy from the energy transmitter device for energy harvesting at the energy receiver device during one or more energy harvesting intervals, transmit, to the energy receiver device, a first signal, receive, from the energy receiver device, a second signal from which the energy transmitter device determines CSI of the channel, the CSI based on the first signal, and transmit, to the energy receiver device, one or more additional signals whose transmission characteristics are based on the CSI.

Another apparatus for wireless communication at an energy transmitter device is described. The apparatus may include means for transmitting an energy signal to an energy receiver device via a channel, the energy signal providing energy from the energy transmitter device for energy harvesting at the energy receiver device during one or more energy harvesting intervals, means for transmitting, to the energy receiver device, a first signal, means for receiving, from the energy receiver device, a second signal from which the energy transmitter device determines CSI of the channel, the CSI based on the first signal, and means for transmitting, to the energy receiver device, one or more additional signals whose transmission characteristics are based on the CSI.

A non-transitory computer-readable medium storing code for wireless communication at an energy transmitter device is described. The code may include instructions executable by a processor to transmit an energy signal to an energy receiver device via a channel, the energy signal providing energy from the energy transmitter device for energy harvesting at the energy receiver device during one or more energy harvesting intervals, transmit, to the energy receiver device, a first signal, receive, from the energy receiver device, a second signal from which the energy transmitter device determines CSI of the channel, the CSI based on the first signal, and transmit, to the energy receiver device, one or more additional signals whose transmission characteristics are based on the CSI.

Some examples of the method, apparatuses, and non-transitory computer-readable medium described herein may further include operations, features, means, or instructions for transmitting, to the energy receiver device and before transmitting the first signal, a query signal indicating a configuration of the second signal for indicating the CSI to the energy transmitter device, where the CSI may be determined based on the configuration of the second signal.

In some examples of the method, apparatuses, and non-transitory computer-readable medium described herein, receiving the second signal may include operations, features, means, or instructions for receiving a reflection of the first signal received at the energy receiver device based on the configuration of the second signal indicating for the energy receiver device to reflect the first signal, the CSI determined from the second signal based on a measurement of the reflection.

In some examples of the method, apparatuses, and non-transitory computer-readable medium described herein, receiving the second signal may include operations, features, means, or instructions for receiving a modulated reflection of the energy signal received at the energy receiver device during an energy harvesting interval of the one or more energy harvesting intervals that occurs after transmitting the first signal based on the configuration of the second signal indicating for the energy receiver device to modulate and reflect the energy signal received during the energy harvesting interval, the CSI determined from the second signal based on the modulation of the reflection of the energy signal.

In some examples of the method, apparatuses, and non-transitory computer-readable medium described herein, receiving the second signal may include operations, features, means, or instructions for receiving a feedback message including the CSI based on a type of the energy receiver device and the configuration of the second signal indicating a waveform for communicating the CSI.

In some examples of the method, apparatuses, and non-transitory computer-readable medium described herein, the query signal indicates that the energy receiver device is to communicate the CSI with the energy transmitter device and the first signal may be transmitted to the energy receiver device and the second signal may be received from the energy receiver device based on transmitting the query signal.

In some examples of the method, apparatuses, and non-transitory computer-readable medium described herein, the first signal may be transmitted after an energy harvesting interval of the one or more energy harvesting intervals that occurs after transmitting the query signal.

Some examples of the method, apparatuses, and non-transitory computer-readable medium described herein may further include operations, features, means, or instructions for transmitting, to a set of energy receiver devices including the energy receiver device and before transmitting the first signal, a select signal indicating that the set of energy receiver devices is to communicate respective CSI with the energy transmitter device via respective channels, where the first signal may be transmitted to the energy receiver device and the second signal may be received from the energy receiver device based on transmitting the select signal.

Some examples of the method, apparatuses, and non-transitory computer-readable medium described herein may further include operations, features, means, or instructions for transmitting, to the energy receiver device, a query signal that indicates a configuration of the second signal for indicating the CSI to the energy transmitter device, where the select signal may be transmitted before an energy harvesting interval of the one or more energy harvesting intervals that occurs before transmitting the query signal.

In some examples of the method, apparatuses, and non-transitory computer-readable medium described herein, transmitting the one or more additional signals may include transmitting a third signal. Some examples of the method, apparatuses, and non-transitory computer-readable medium described herein may further include operations, features, means, or instructions for receiving, from the energy receiver device, a fourth signal from which the energy transmitter device determines second CSI of the channel, the second CSI based on the third signal.

In some examples of the method, apparatuses, and non-transitory computer-readable medium described herein, the third signal may be transmitted after a configured time interval for processing the second signal at the energy transmitter device.

In some examples of the method, apparatuses, and non-transitory computer-readable medium described herein, transmitting the one or more additional signals may include operations, features, means, or instructions for transmitting, to the energy receiver device, a query signal indicating for the energy receiver device to communicate second CSI of the channel with the energy transmitter device.

In some examples of the method, apparatuses, and non-transitory computer-readable medium described herein, the query signal may be transmitted after an energy harvesting interval of the one or more energy harvesting intervals that occurs after receiving the second signal.

In some examples of the method, apparatuses, and non-transitory computer-readable medium described herein, transmitting the one or more additional signals may include operations, features, means, or instructions for transmitting the one or more additional signals using a beam whose parameters may be based on the CSI, a set of pre-coding parameters that may be based on the CSI, or both.

A method for wireless communication at an energy receiver device is described. The method may include receiving an energy signal from an energy transmitter device via a channel, the energy signal providing energy from the energy transmitter device for energy harvesting at the energy receiver device during one or more energy harvesting intervals, receiving, from the energy transmitter device, a first signal, transmitting, to the energy transmitter device, a second signal indicative of CSI of the channel, the CSI based on the first signal, and receiving, from the energy transmitter device, one or more additional signals whose transmission characteristics are based on the CSI.

An apparatus for wireless communication at an energy receiver device is described. The apparatus may include a processor, memory coupled with the processor, and instructions stored in the memory. The instructions may be executable by the processor to cause the apparatus to receive an energy signal from an energy transmitter device via a channel, the energy signal providing energy from the energy transmitter device for energy harvesting at the energy receiver device during one or more energy harvesting intervals, receive, from the energy transmitter device, a first signal, transmit, to the energy transmitter device, a second signal indicative of CSI of the channel, the CSI based on the first signal, and receive, from the energy transmitter device, one or more additional signals whose transmission characteristics are based on the CSI.

Another apparatus for wireless communication at an energy receiver device is described. The apparatus may include means for receiving an energy signal from an energy transmitter device via a channel, the energy signal providing energy from the energy transmitter device for energy harvesting at the energy receiver device during one or more energy harvesting intervals, means for receiving, from the energy transmitter device, a first signal, means for transmitting, to the energy transmitter device, a second signal indicative of CSI of the channel, the CSI based on the first signal, and means for receiving, from the energy transmitter device, one or more additional signals whose transmission characteristics are based on the CSI.

A non-transitory computer-readable medium storing code for wireless communication at an energy receiver device is described. The code may include instructions executable by a processor to receive an energy signal from an energy transmitter device via a channel, the energy signal providing energy from the energy transmitter device for energy harvesting at the energy receiver device during one or more energy harvesting intervals, receive, from the energy transmitter device, a first signal, transmit, to the energy transmitter device, a second signal indicative of CSI of the channel, the CSI based on the first signal, and receive, from the energy transmitter device, one or more additional signals whose transmission characteristics are based on the CSI.

Some examples of the method, apparatuses, and non-transitory computer-readable medium described herein may further include operations, features, means, or instructions for receiving, from the energy transmitter device and before receiving the first signal, a query signal indicating a configuration of the second signal for indicating the CSI to the energy transmitter device, where the second signal may be transmitted in accordance with the configuration of the second signal.

In some examples of the method, apparatuses, and non-transitory computer-readable medium described herein, transmitting the second signal to the energy transmitter device may include operations, features, means, or instructions for reflecting the first signal back to the energy transmitter device based on the configuration of the second signal indicating for the energy receiver device to reflect the first signal, where a measurement of the reflected first signal may be indicative of the CSI.

Some examples of the method, apparatuses, and non-transitory computer-readable medium described herein may further include operations, features, means, or instructions for determining the CSI based on a measurement of the first signal and modulating the energy signal received at the energy transmitter device during an energy harvesting interval of the one or more energy harvesting intervals that occurs after receiving the first signal, the energy signal modulated to indicate the CSI. In some examples of the method, apparatuses, and non-transitory computer-readable medium described herein, transmitting the second signal to the energy transmitter device may include operations, features, means, or instructions for transmitting the modulated energy signal to the energy transmitter device based on the configuration of the second signal indicating for the energy receiver device to modulate and reflect the energy signal received during the energy harvesting interval.

Some examples of the method, apparatuses, and non-transitory computer-readable medium described herein may further include operations, features, means, or instructions for determining the CSI based on a measurement of the first signal, where transmitting the second signal to the energy transmitter device may include operations, features, means, or instructions for transmitting a feedback message including the CSI based on a type of the energy receiver device and the configuration of the second signal indicating a waveform for communicating the CSI.

In some examples of the method, apparatuses, and non-transitory computer-readable medium described herein, the query signal indicates that the energy receiver device is to communicate the CSI with the energy transmitter device and the first signal may be received from the energy transmitter device and the second signal may be transmitted to the energy transmitter device based on receiving the query signal.

In some examples of the method, apparatuses, and non-transitory computer-readable medium described herein, the first signal may be received after an energy harvesting interval of the one or more energy harvesting intervals that occurs after receiving the query signal.

Some examples of the method, apparatuses, and non-transitory computer-readable medium described herein may further include operations, features, means, or instructions for receiving, from the energy transmitter device and before receiving the first signal, a select signal indicating that a set of energy receiver devices is to communicate respective CSI with the energy transmitter device via respective channels, the set of energy receiver devices including the energy receiver device, where the first signal may be received from the energy transmitter device and the second signal may be transmitted to the energy transmitter device based on receiving the select signal.

Some examples of the method, apparatuses, and non-transitory computer-readable medium described herein may further include operations, features, means, or instructions for receiving, from the energy transmitter device, a query signal that indicates a configuration of the second signal for indicating the CSI to the energy transmitter device, where the select signal may be received before an energy harvesting interval of the one or more energy harvesting intervals that occurs before receiving the query signal.

In some examples of the method, apparatuses, and non-transitory computer-readable medium described herein, the second signal may be transmitted after a configured time interval for processing the first signal at the energy receiver device.

In some examples of the method, apparatuses, and non-transitory computer-readable medium described herein, receiving the one or more additional signals includes receiving a third signal. Some examples of the method, apparatuses, and non-transitory computer-readable medium described herein may further include operations, features, means, or instructions for transmitting, to the energy transmitter device, a fourth signal indicative of second CSI of the channel, the second CSI based on the third signal.

In some examples of the method, apparatuses, and non-transitory computer-readable medium described herein, receiving the one or more additional signals may include operations, features, means, or instructions for receiving, from the energy transmitter device, a query signal indicating for the energy receiver device to communicate second CSI of the channel with the energy transmitter device.

In some examples of the method, apparatuses, and non-transitory computer-readable medium described herein, the query signal may be received after an energy harvesting interval of the one or more energy harvesting intervals that occurs after transmitting the second signal.

In some examples of the method, apparatuses, and non-transitory computer-readable medium described herein, receiving the one or more additional signals may include operations, features, means, or instructions for receiving the one or more additional signals using a beam whose parameters may be based on the CSI.

DETAILED DESCRIPTION

Figure 1:
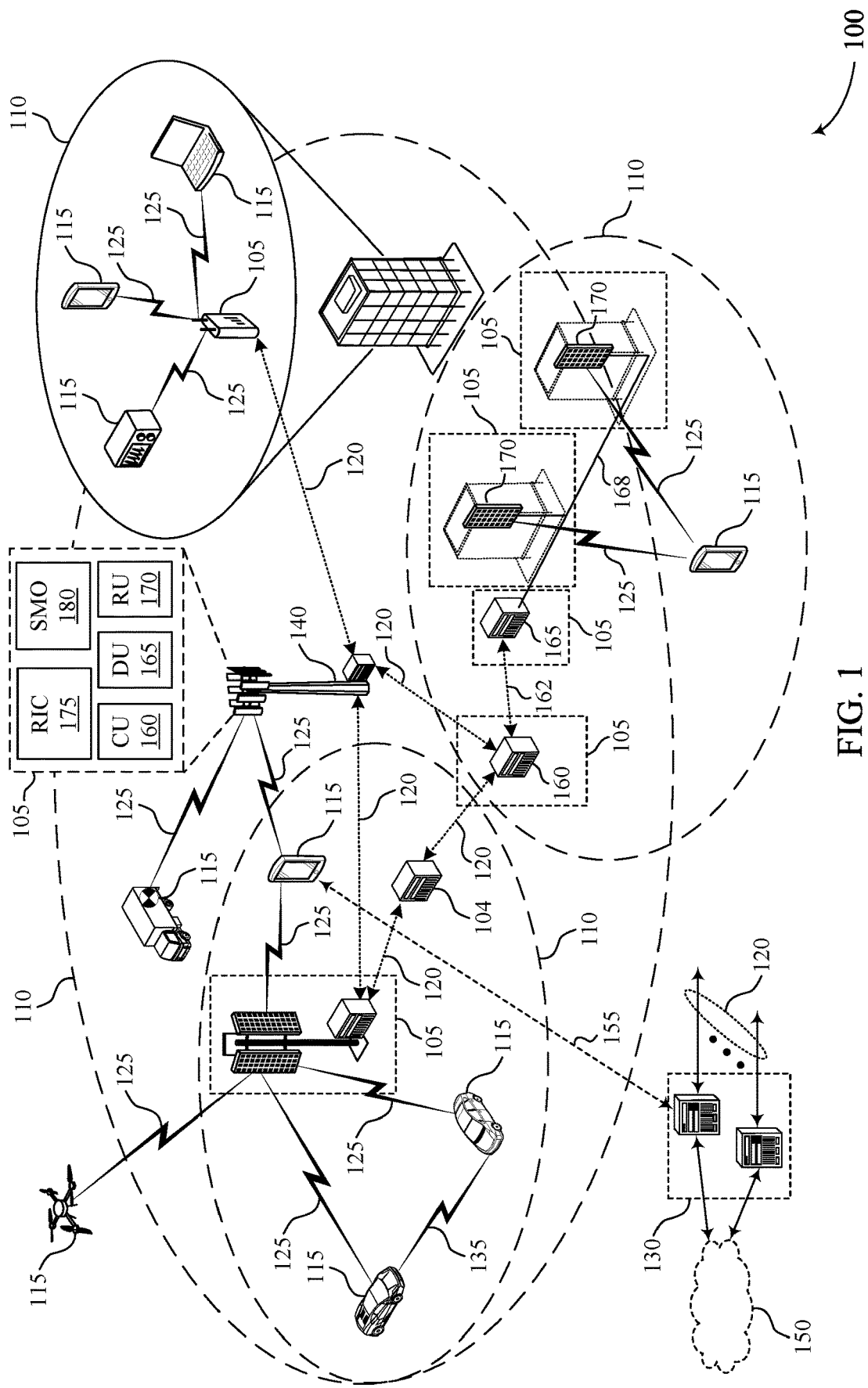
FIGS. 1, 2, and 3 illustrate examples of wireless communications systems that supports techniques for communicating channel state information (CSI) for energy transfer operations in accordance with one or more aspects of the present disclosure.

Some wireless communications systems may support communications between energy transfer devices, such as between an energy transmitter device and an energy receiver device. An energy receiver device a low power or passive communication device, such as a radio frequency identifier (RFID) device, a passive Internet of Things (IoT) device, or some other energy receiver device, that uses energy harvested from signals received at the communication device to power one or more components of the communication device and communicate with an energy transmitter device. An energy transmitter device may be a communication device, such as a network entity, a base station, an RFID reader, or some other energy transmitter device, that may transmit, to an energy receiver device, an energy signal that may be harvested by the energy receiver device to support the communication of other signals between the energy transmitter device and the energy receiver device.

In some cases, communications between an energy transmitter device and an energy receiver device may be constrained to a relatively short communication range (e.g., 10 meters or less), which may limit the deployment and implementation of energy receiver devices such as passive IoT devices. For example, as a distance between an energy transmitter device and an energy receiver device increases, a link budget between the energy transmitter device and the energy receiver device may decrease. That is, as the distance increases, the received power at the energy receiver device relative to the transmit power at the energy transmitter device may decrease, thereby resulting in less energy that the energy receiver device may be able to harvest. As a result, communications between the energy receiver device may be impossible (e.g., the energy receiver device is unable to harvest sufficient energy from received energy signals) or may be associated with high power consumption and inefficiency.

Techniques, systems, and devices are described herein to enable the communication of channel state information (CSI) between an energy transmitter device and an energy receiver device, which may increase a link budget between the energy transmitter device and the energy receiver device, among other benefits. For example, the energy transmitter device may transmit a probing signal to the energy receiver device via a channel, for instance, using a set of beamforming weights, a set precoding parameters, or a combination thereof. Based on the probing signal, the energy receiver device may transmit a feedback signal to the energy transmitter device (e.g., using energy harvested from the energy signal) that is indicative of CSI of the channel. For example, the energy receiver device may reflect the probing signal back to the energy transmitter device and a measurement of the reflected probing signal may be indicative of the CSI. Alternatively, the energy receiver device may determine the CSI based on measuring the probing signal and modulate and reflect an energy signal received after the probing signal to indicate the CSI. Alternatively, the energy receiver device may determine the CSI based on measuring the probing signal and may transmit a feedback message that includes the CSI using a waveform indicated by the energy transmitter device.

In response to receiving the feedback signal, the energy transmitter device may determine the CSI and transmit additional signals to the energy receiver device based on the CSI. For example, the energy transmitter device may transmit additional probing signals for the communication of additional CSI, additional energy signals, or data, among other signals described herein, where the transmission characteristics of the additional signals are based on the CSI (e.g., transmitted using a beam or a set of precoding parameters that are based on the CSI).

Aspects of the subject matter described in this disclosure may be implemented to realize one or more of the following potential improvements, among others. The techniques employed by the described communication devices may enable the communication of CSI between an energy transmitter device and an energy receiver device, which may support beamforming and communication precoding between the energy transmitter device and the energy receiver device. For example, the select beamforming weights, precoding parameters, or both, based on the CSI, which may increase the received power of a signal transmitted by the energy transmitter (e.g., increase a link budget between the energy transmitter device and the energy receiver device). As a result, power consumption may be reduced and communication range may be increased. For example, the energy from beamformed signals and precoded signals may be more efficiently harvested by an energy receiver device than non-beamformed signals or unprecoded signals. Accordingly, beamforming and/or precoding a signal may enable a reduction in transmit power of the signal or an increased communication range of the signal. Additionally, the energy transmitter device may be able to charge the energy receiver device more efficiently using beamformed energy signals. In some examples, communicating CSI between the energy transmitter device and the energy receiver device may reduce latency, increase throughput and data rates, and increase resource utilization efficiency (e.g., by enabling the use of higher modulation and coding schemes (MCS), reducing bit errors, etc.). In some cases, communicating CSI between the energy transmitter device and the energy receiver device may increase communication reliability, improve coordination between devices, and increase battery life, among other benefits.

Aspects of the disclosure are initially described in the context of wireless communications systems. Aspects of the disclosure are additionally described in the context of communication sequences. Aspects of the disclosure are further illustrated by and described with reference to apparatus diagrams, system diagrams, and flowcharts that relate to techniques for communicating CSI for energy transfer operations.

FIG. 1 illustrates an example of a wireless communications system 100 that supports techniques for communicating CSI for energy transfer operations in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for communicating CSI for energy transfer operations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a CSI-reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The wireless communications system 100 may support the communication of CSI between communication devices. For example, communication devices (e.g., network entities 105, UEs 115) may exchange CSI (e.g., a network entity 105 may gather CSI from a UE 115, UEs 115 may exchange CSI) to efficiently configure and schedule the channel. In some examples, this information may be sent from a UE 115 in the form of a CSI report. A CSI report may contain: a rank indicator (RI) requesting a number of layers to be used for transmissions (e.g., based on antenna ports of the UE 115); a layer indicator (LI) indicating a strongest layer of the number of layers requested by the RI; a precoding matrix indicator (PMI) indicating a preference for which precoder matrix should be used (e.g., based on a number of layers); a channel quality indicator (CQI) representing a highest MCS that may be used; a CSI-RS resource indicator (CRI) indicating a preferred beam for communicating with a communication device (e.g., a network entity 105, another UE 115); a synchronization signal block (SSB) resource indicator (SSBRI) indicating an SSB that the UE 115 receives with a highest received power (e.g., reference signal received power (RSRP), or a combination thereof.

In some cases, an RI may be associated with a number of antennas used by a device. CQI may be calculated by a UE 115 in response to receiving predetermined pilot symbols such as cell-specific reference signals (CRS) or CSI-RSs. RI and PMI may be excluded if the UE 115 does not support spatial multiplexing (or is not in a supported spatial mode). In some examples, the types of information included in the CSI report may determine a reporting type.

The wireless communications system 100 may support wireless communications between energy transfer devices, such as wireless communications between an energy transmitter device and an energy receiver device. Examples of energy transmitter devices include a network entity 105, a base station 140, and an RFID reader, among other energy transmitter devices. That is, an energy transmitter device may be a communication device that may transmit, to an energy receiver device, an energy signal that may be harvested by an energy receiver device to support the communication of other signals (e.g., information signals) between the energy transmitter device and the energy receiver device. For example, the energy receiver device may harvest and use energy from the energy signal to power one or more components of the energy receiver device and communicate with the energy transmitter device (e.g., process received information signals, transmit information signals, backscatter information signals). Examples of energy receiver devices include an RFID reader, a passive IoT device, a passive IoE device, and a UE 115 (e.g., a low power or low complexity UE 115), among other energy receiver devices. That is, an energy receiver device may be a communication device that uses harvested energy (e.g., at least in part) from received energy signals to perform wireless communications.

In accordance with examples disclosed herein, the wireless communications system may support the communication of CSI between an energy transmitter device and an energy receiver device. For example, the energy transmitter device may transmit a probing signal the to the energy receiver device that the energy receiver device may use to report CSI back to the energy transmitter device. For example, the energy receiver device may transmit a feedback signal to the energy transmitter device (e.g., using energy harvested from energy signals) that is indicative of the CSI, where the CSI is based on the probing signal. The energy transmitter device and the energy receiver device may then communicate additional signals based on the CSI (e.g., using beams or precoding parameters selected based on the CSI).

Figure 2:
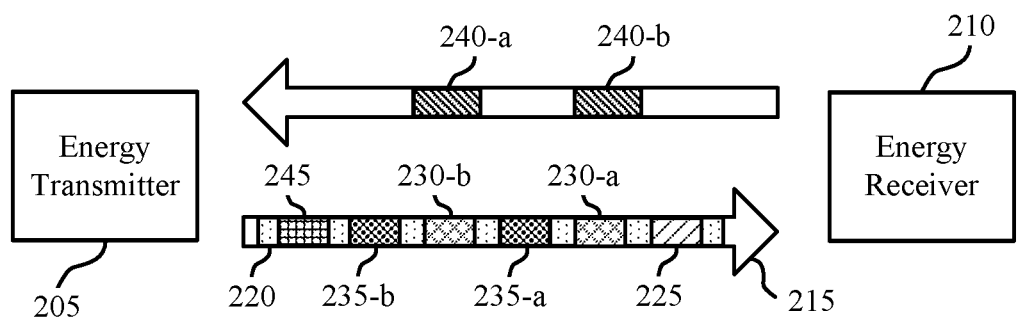
Figure 2:
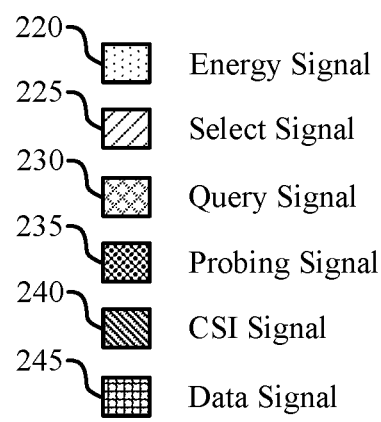

FIG. 2 illustrates an example of a wireless communications system 200 that supports techniques for communicating CSI for energy transfer operations in accordance with one or more aspects of the present disclosure. The wireless communications system 200 may implement or be implemented by aspects of the wireless communications system 100 described with reference to FIG. 1. For example, the wireless communications system 200 may include an energy transmitter 205 and an energy receiver 210. In some examples, the energy transmitter 205 may be an example of an energy transmitter device or a network entity 105 described with reference to FIG. 1. In some examples, the energy receiver 210 may be an example of an energy receiver device or a UE 115 described with reference to FIG. 1. The wireless communications system 200 may support CSI communication between energy transfer devices (e.g., between the energy transmitter 205 and the energy receiver 210), which may support beamforming between energy transmitter and energy receiver devices, improved precoding parameter selection, increased communication range between energy transmitter and energy receiver devices, increased link budget, increased communication reliability, reduced latency, increased throughput and data rates, reduced power consumption, and improved (e.g., more efficient) power harvesting, among other benefits.

The wireless communications system 200 may support communications between the energy transmitter 205 and the energy receiver 210. For example, the energy transmitter 205 may communicate signals with the energy receiver 210 over respective communication links 215, which may be examples of a communication link 125 described with reference to FIG. 1.

To support communications between the energy transmitter 205 and the energy receiver 210, the energy transmitter 205 may be configured to perform wireless power transfer to the energy receiver 210. For example, the energy transmitter 205 may transmit an energy signal 220 to the energy receiver 210 via a channel (e.g., over a communication link 215), and the energy receiver 210 may perform energy harvesting to harvest energy from the energy signal 220 for use in powering one or more components of the energy receiver 210. In some examples, the energy transmitter 205 may transmit the energy signal 220 during one or more energy harvesting intervals during which the energy receiver 210 may perform energy harvesting. In some examples, the energy transmitter 205 may simultaneously transmit information and perform wireless power transfer. For example, the energy transmitter 205 may transmit information signals (e.g., a select signal 225, a query signal 230, a probing signal 235, a data signal 245) that are used to jointly transfer information and provide energy for energy harvesting (e.g., using a same waveform). Thus in some cases, the information signals may constitute energy signals 220 that are encoded with information for the energy receiver 210.

The wireless communications system 200 may support the communication of CSI between the energy transmitter 205 and the energy receiver 210, for example, to improve a link budget between the energy transmitter 205 and the energy receiver and support beamforming and precoding, among other benefits. To communicate CSI of the channel via which the energy transmitter 205 and the energy receiver 210 communicate, the energy transmitter 205 may be configured to transmit a probing signal 235 to the energy receiver 210. For example, the energy transmitter 205 may transmit a probing signal 235-a using a first set of beamforming parameters (e.g., using a first beam, using a first set of beamforming weights), a first set of precoding parameters (e.g., a first set of precoding weights, a first precoding matrix), or a combination thereof. Based on the probing signal 235-a, the energy receiver 210 may transmit a CSI signal 240 (e.g., a feedback signal) that is indicative of the CSI. For example, the energy receiver 210 may transmit a CSI signal 240-a in response to the probing signal 235-a that is indicative of the CSI of the channel.

The CSI signal 240-a may indicate the CSI of the channel in accordance with a configuration of the CSI signal 240-a that is indicated by the energy transmitter 205. For example, the energy transmitter 205 may specify to the energy receiver 210 a CSI feedback scheme (e.g., of a set of different CSI feedback schemes) according to which the energy receiver 210 may indicate the CSI to the energy transmitter in response to a given probing signal 235. To indicate the configuration of a CSI signal 240, the energy transmitter 205 may transmit a query signal 230 to the energy receiver 210 that indicates the configuration of the CSI signal 240. For example, the energy transmitter 205 may transmit a query signal 230-a before transmitting the probing signal 235-a that indicates to the energy receiver 210 how the energy receiver 210 is to feedback the CSI to the energy transmitter 205 in response to the probing signal 235-a. In some examples, a query signal 230 may indicate the configuration of multiple CSI signals 240. For example, the energy receiver 210 may be configured to use the indicated configuration to transmit a CSI signal 240 for each probing signal 235 received within a given probing session (e.g., as described with reference to FIGS. 4 through 6 below).

The energy receiver 210 may support various configurations for transmitting a CSI signal 240 to indicate the CSI. For example, the query signal 230-a may indicate for the energy receiver 210 to provide the CSI by reflecting (e.g., backscattering) the probing signal 235-a back to the energy transmitter 205. Here, the CSI signal 240-a may correspond to a reflection of the probing signal 235-a. The energy transmitter 205 may receive the reflected probing signal 235-a and determine (e.g., infer) the CSI based on one or more measurements of the reflected probing signal 235-a. Additional details related to the communicating the CSI by reflecting a probing signal 235 are described with reference to FIG. 4 below.

Alternatively, the query signal 230-a may indicate for the energy receiver to provide the CSI by modulating and reflecting an energy signal 220 received after the probing signal 235-a. For example, in accordance with the configuration indicated by the query signal 230-a, the energy receiver 210 may receive the probing signal 235-a and determine (e.g., estimate) the CSI based on one or more measurements of the probing signal 235-a. To indicate the determined CSI to the energy transmitter 205, the energy receiver 210 may modulate and reflect an energy signal 220 received after the probing signal 235-a such that the modulation of the reflected energy signal indicates the determined CSI to the energy transmitter 205. Thus here, the CSI signal 240-a may correspond to a modulated reflection of the energy signal 220 received at the energy receiver 210 after the probing signal 235-a. Additional details related to the communicating the CSI by modulating and reflecting an energy signal 220 are described with reference to FIG. 5 below.

Alternatively, the query signal 230-a may indicate for the energy receiver to provide the CSI by transmitting a feedback message that includes the CSI according to a waveform indicated by the query signal 230-a. For example, in accordance with the configuration indicated by the query signal 230-a, the energy receiver 210 may receive the probing signal 235-a and determine (e.g., estimate) the CSI based on one or more measurements of the probing signal 235-a. The energy receiver 210 may generate a feedback message that includes the determined CSI and transmit the feedback message to the energy transmitter 205 using the indicated waveform. Thus here, the CSI signal 240-a may correspond to the feedback message including the determined CSI. Additional details related to the communicating the CSI by transmitting a feedback message including the CSI are described with reference to FIG. 6 below.

In some examples, the energy transmitter 205 may select one or more energy receivers 210 from a set of energy receivers 210 to provide CSI feedback in response to a probing signal 235 (e.g., to participate in a given probing session). For example, the energy transmitter 205 may transmit (e.g., broadcast) one or more of a select signal 225 and a query signal 230 to indicate which energy receivers 210 of the set of energy receiver 210 are to provide the CSI feedback. For instance, the energy transmitter 205 may transmit a select signal 225 to a set of energy receivers 210 that includes the energy receiver 210. The select signal 225 may indicate which energy receivers 210 (e.g., one or more energy receivers 210) of the set of energy receivers 210 are to communicate respective CSI with the energy transmitter 205 via respective channels. To indicate which energy receivers 210 are to communicate the respective CSI, the select signal 225 may include energy receiver identifiers (ER-IDs) or ER-ID prefixes corresponding to the energy receivers 210 that are to communicate the respective CSI. For example, the select signal 225 may include ER-IDs corresponding to each of the energy receivers 210 that are communicate the respective CSI. Alternatively, the select signal 225 may include one or more ER-ID prefixes (e.g., to reduce signaling overhead and processing), and energy receivers 210 of the set of energy receivers 210 having an ER-ID prefix of the one or more ER-ID prefixes may be indicated to communicate the respective CSI.

In the example of FIG. 2, the select signal 225 may include an ER-ID or an ER-ID prefix corresponding to the energy receiver 210 and may thus indicate for the energy receiver 210 to communicate CSI with the energy transmitter 205. In some examples, the energy transmitter 205 may transmit one or more of the query signal 230-a and the probing signal 235-a to the energy receiver 210 based on the select signal 225 selecting the energy receiver 210. In some examples, the select signal 225 may select (e.g., generally) the energy receiver 210 for communicating the CSI, and a query signal 230 may indicate for which probing signals 235 the energy receiver 210 is to provide the CSI. For example, the query signal 230-a may indicate that the energy receiver 210 is to provide CSI feedback in response to the probing signal 235-a (e.g., and one or more other probing signals 235 transmitted during a probing session corresponding to the query signal 230-a) and in accordance with the indicated configuration. That is, in some examples, the select signal 225 and the query signal 230-a may be transmitted as part of a two-tier (e.g., two-step) selection procedure for selecting the energy receiver 210 to transmit the CSI signal 240-*a* in response to the probing signal 235-*a*.

In response to the CSI signal 240-*a*, the energy transmitter 205 may be configured to transmit one or more additional signals based on the CSI indicated by the CSI signal 240-*a*. For example, the energy transmitter 205 may transmit one or more additional probing signals 235 whose transmission characteristics are based on the CSI and in response to which the energy receiver 210 may transmit additional CSI signals 240 (e.g., a CSI signal 240-*b*) in accordance with the configuration indicated by the query signal 230-*a*. The energy transmitter 205 may transmit each additional probing signal 235 using a same or different set of beamforming parameters as the probing signal 235-*a*, a same or a different set of precoding parameters as the probing signal 235-*a*, or a combination thereof, based on the CSI. For example, the energy transmitter 205 may use same sets of beamforming parameters and/or precoding parameters to transmit the additional probing signals 235 to determine whether the additional CSI signals 240 indicate CSI similar to or the same as the CSI indicated by the CSI signal 240-*a* (e.g., to determine whether channel conditions of the channel are relatively stable).

Alternatively the energy transmitter 205 may use different sets of beamforming parameters and/or precoding parameters to transmit the additional probing signals to determine whether the different sets of beamforming parameters and/or precoding parameters are associated with improved communications (e.g., increased link budget, increased reliability) between the energy transmitter 205 and the energy receiver 210 relative to the parameters used to transmit the probing signal 235-*a*. For example, the energy transmitter 205 may compare the CSI indicated by the additional CSI signals 240 to the CSI indicated by the CSI signal 240-*a* to determine which sets of beamforming and/or precoding parameters to use for subsequent communications with the energy receiver 210.

Additionally or alternatively, the energy transmitter 205 may transmit an additional query signal 230 (e.g., a query signal 230-*b*) that indicates a same or a different configuration for transmitting CSI signals 240 (e.g., a CSI signal 240-*b*) in response to one or more additional probing signals 235 (e.g., a probing signal 235-*b*). The one or more additional probing signals 235 may be transmitted using same or different sets of beamforming parameters and/or precoding parameters.

Additionally or alternatively, the energy transmitter 205 may transmit one or more data signals 245 based on the CSI indicated by the CSI signal 240-*a*, the CSI indicated by a subsequent CSI signal 240, or a combination thereof. For example, the energy transmitter 205 may transmit a data signal 245 using a beam whose parameters (e.g., weights) are selected based on the CSI received from the energy receiver 210, a set of precoding parameters selected based on the CSI, or a combination thereof. In some examples, an MCS used to encode the data signal 245 may be based on the CSI. In some examples, the data signal 245 may transmit data to the energy receiver 210, for example, to be stored or used by the energy receiver 210 (e.g., may write information to the energy receiver 210). In some examples, the data signal 245 may request for the energy receiver 210 to transmit data to the energy transmitter 205 (e.g., may read information stored by the energy receiver 210). In some examples, the data signal 245 may be an information-bearing signal that the energy receiver 210 may reflect to indicate information to the energy transmitter 205 (e.g., a reading of a sensor of the energy receiver 210, among other types of information).

Additionally or alternatively, the energy transmitter 205 may transmit energy signals 220 based on the CSI indicated by the CSI signal 240-*a*, the CSI indicated by a subsequent CSI signal 240, or a combination thereof. The energy signals 220 transmitted based on indicated CSI may be able to more efficiently charge or be more efficiently harvested by the energy receiver 210, for example, due to transmitting the energy signals 220 using the beam and/or the set of precoding parameters. In some examples, the data signal 245 may be an example of an energy signal 220 that is transmitted based on indicated CSI.

By communicating the CSI between the energy transmitter 205 and the energy receiver 210, communication characteristics of signals communicated between the energy transmitter 205 and the energy receiver 210 may be improved. For example, by using a beam and/or precoding parameters that are based on the CSI, a link budget of signals communicated between the energy transmitter 205 and the energy receiver 210 may be increased, which may enable power savings and increased communication range, among other benefits. Additionally, a reliability, a throughput, and a data rate of the signals may be increased, among other benefits.

Figure 3:
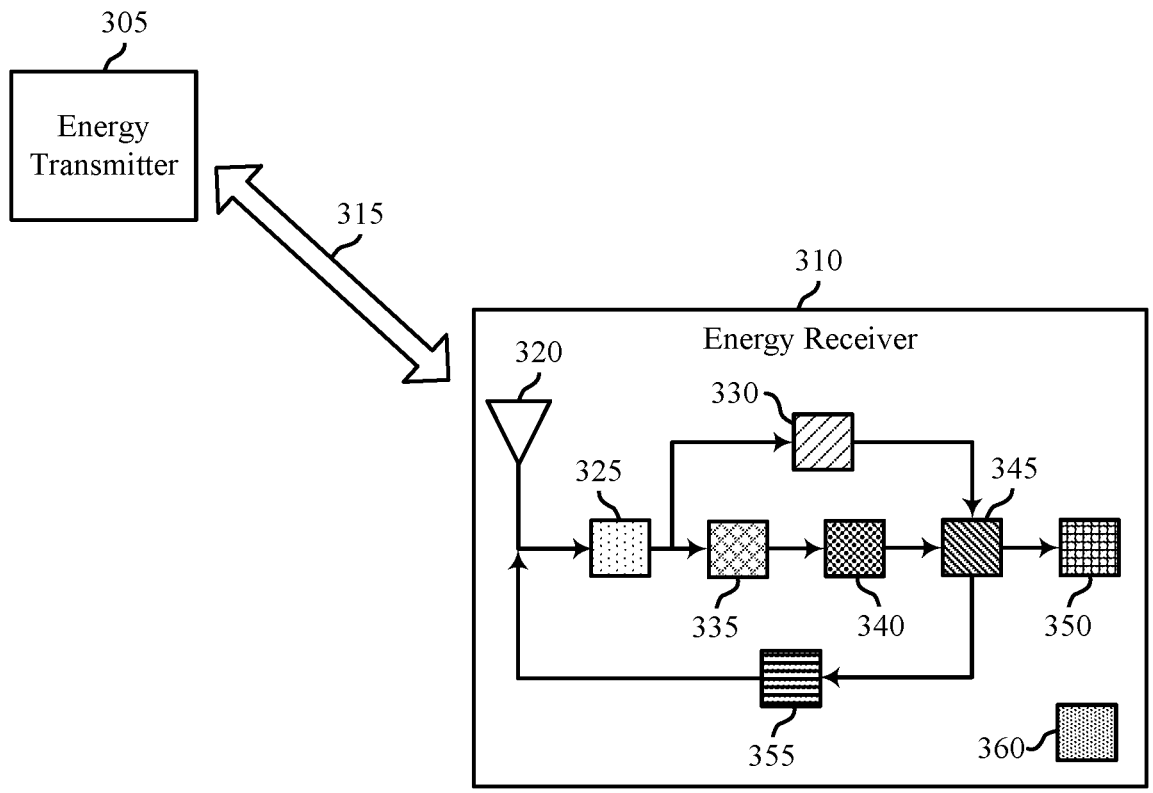
Figure 3:
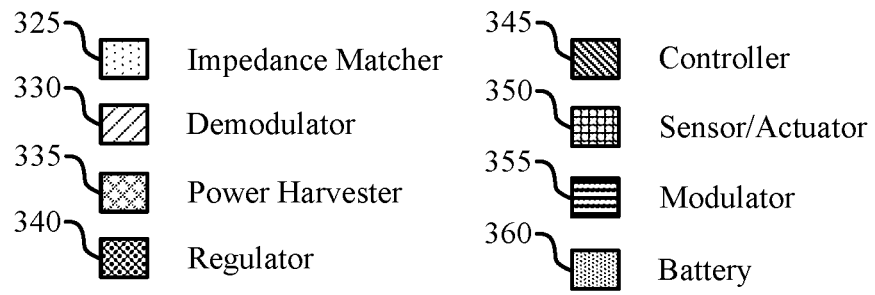

FIG. 3 illustrates an example of a wireless communications system 300 that supports techniques for communicating CSI for energy transfer operations in accordance with one or more aspects of the present disclosure. The wireless communications system 300 may implement or be implemented by aspects of the wireless communications systems 100 and 200 described with reference to FIGS. 1 and 2, respectively. For example, the wireless communications system 300 may include an energy transmitter 305 and an energy receiver 310, which may be examples of the corresponding devices described with reference to FIGS. 1 and 2.

The wireless communications system 300 may support communications between the energy transmitter 305 and the energy receiver 310. For example, the energy transmitter 305 may communicate signals with the energy receiver 310 over a communication link 315, which may be an example of a communication link 125 or a communication link 215 described with reference to FIGS. 1 and 2, respectively.

The wireless communications system 300 may support the communication of CSI between the energy transmitter 305 and the energy receiver 310 as described with reference to FIG. 2 (e.g., via the communication of a combination of select signals 225, query signals 230, probing signals 235, and CSI signals 240).

The energy receiver 310 may include various components to support the communication of signaling with the energy transmitter 305. For example, the energy receiver 310 may include an antenna 320 that supports the reception of signals transmitted by the energy transmitter 305 and the transmission of signals to the energy transmitter 305. The energy receiver 310 may also include an impedance matcher 325 (e.g., coupled with the antenna 320). The impedance matcher 325 may be a fixed or adjustable component that may set an impedance of a line from the antenna 320. Absorption or reflection of signals received at the antenna 320 may be based on an impedance of the impedance matcher.

The energy receiver 310 may include a power harvester 335 that is operable to harvest energy from energy signals received from the energy transmitter 305. For example, energy signals received from the energy transmitter 305 may be routed to the power harvester 335, which may harvest energy from the energy signals to power one or more components of the energy receiver 310. In some examples, the energy receiver 310 may include a regulator 340 that is operable to regulate the energy harvested by the power harvester 335. For example, the regulator 340 may regulate the energy to a voltage or a current that is compatible with the one or more components powered by the energy.

The energy receiver 310 may include a demodulator 330 that is operable to demodulate signals received from the energy transmitter 305 and send the demodulated signals to a controller 345 included in the energy receiver 310. In some examples, the controller 345 may be an example of a microcontroller. The controller 345 may process the demodulated signals and perform one or more operations based on the information included in the demodulated signals. For example, the controller 345 may operate a sensor 350 or an actuator 350 included in (e.g., or coupled with, connected to) the energy receiver 310 in accordance with the information. For instance, the controller 345 may activate the sensor 350, deactivate the sensor 350, read a measurement taken by the sensor 350, activate the actuator 350, deactivate the actuator 350, or a combination thereof, among other operations that the controller 345 may perform.

In some examples, the controller 345 may send signaling to a modulator 355 that is to be transmitted to the energy transmitter 305. The modulator 355 may modulate the signaling in accordance with an MCS and send the modulated signaling to the antenna 320 for transmission. For example, the modulator 355 may modulate an energy signal based on determined CSI and send the modulate energy signal to the antenna 320 for transmission to the energy transmitter 305. Additionally, the modulator 355 may modulate identification information associated with the energy receiver 310, data, information associated with operation of the energy receiver 310, or information associated with the sensor 350 or the actuator 350, among other types of signaling that may be modulated by the modulator 355 and transmitted to the energy transmitter 305.

The wireless communications system 300 may support various types of energy receivers 310. For example, a first type of energy receiver 310 may correspond to an energy receiver 310 that excludes or is unconnected from a power source, such as a battery 360 (although other types of power sources are possible). Here, the components of the energy receiver 310 may be powered by the energy harvested from energy signals received at the energy receiver 310. A second type of energy receiver 310 may correspond to an energy receiver 310 that includes or is connected to a power source, such as the battery 360. Here, the components of the energy receiver 310 may be powered by the energy harvested from energy signals, the battery 360, or a combination thereof. In some examples, the power harvested from the energy signals may be used to charge the battery 360, which may increase a battery life of the battery 360 and reduce a frequency at which the battery 360 is replaced, among other benefits.

In some examples, a configuration of a CSI signal that is indicative of CSI (e.g., a CSI signal 240) that is supported by the energy receiver 310 may be based on a type of the energy receiver 310. For example, an energy receiver 310 of the first type may support indicating the CSI by reflecting a probing signal or modulating and reflecting an energy signal, however, transmitting a feedback message that includes the CSI may be unsupported by an energy receiver 310 of the first type. An energy receiver 310 of the second type may support indicating the CSI by reflecting the probing signal, modulation and reflecting an energy signal, or transmitting a feedback message that includes the CSI.

Figure 4:
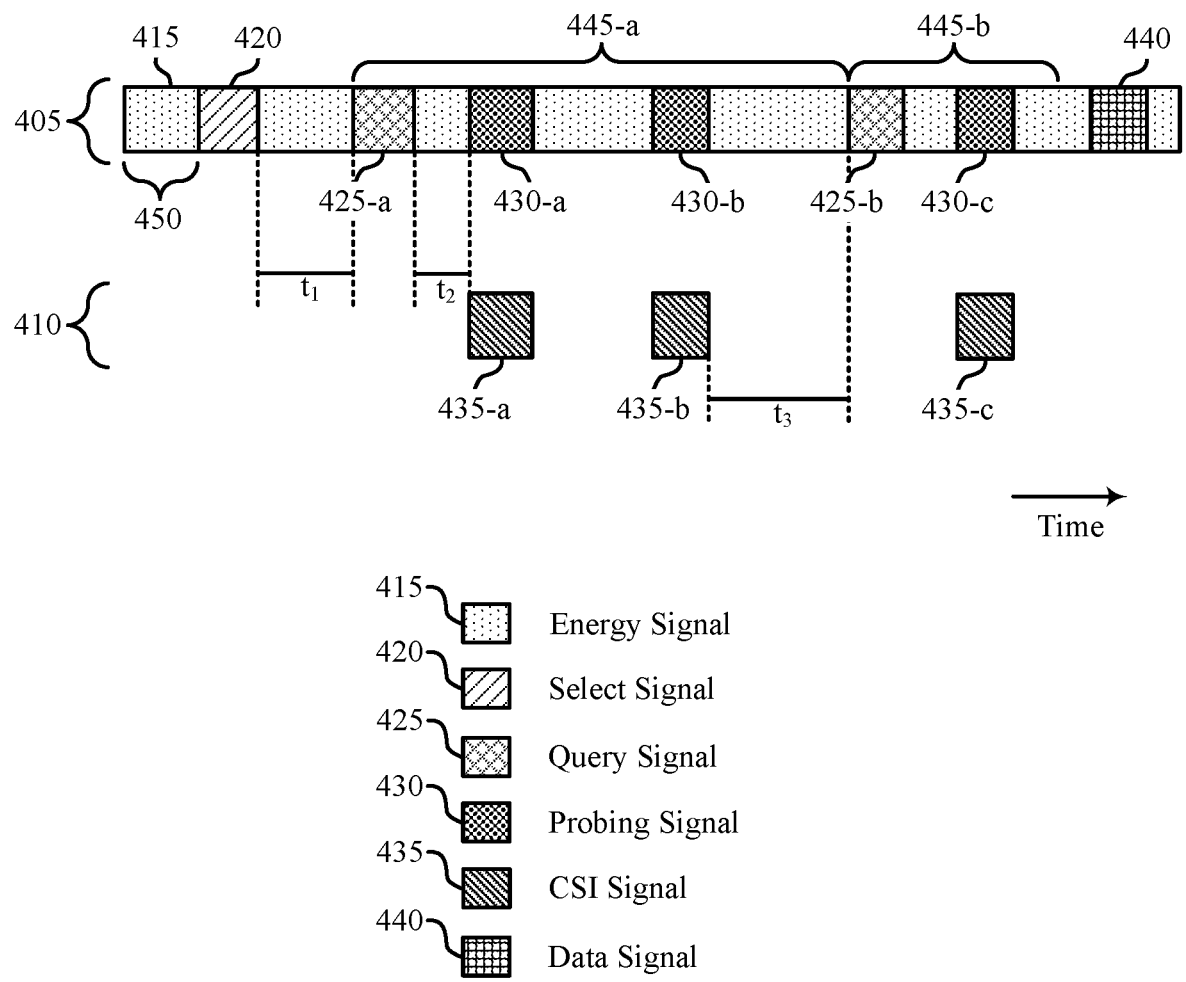
FIGS. 4, 5, and 6 illustrate example of communication sequences that support techniques for communicating CSI for energy transfer operations in accordance with one or more aspects of the present disclosure.

FIG. 4 illustrates an example of a communication sequence 400 that supports techniques for communicating CSI for energy transfer operations in accordance with one or more aspects of the present disclosure. The communication sequence 400 may implement or be implemented by aspects of the wireless communications systems 100, 200, and 300 described with reference to FIGS. 1 through 3, respectively. For example, the communication sequence 400 may be implemented by an energy transmitter and an energy receiver described with reference to FIGS. 1 through 3 to support the communication of CSI between the energy transmitter and the energy receiver.

The communication sequence 400 includes signaling 405 and signaling 410 that are communicated between the energy transmitter and the energy receiver. The signaling 405 may correspond to signaling that is transmitted from the energy transmitter to the energy receiver. The signaling 410 may correspond to signaling that is transmitted from the energy receiver to the energy transmitter.

The signaling 405 may include an energy signal 415 transmitted by the energy transmitter during one or more energy harvesting intervals 450. The energy signal 415 may be harvested by the energy receiver to power one or more components of the energy receiver such that communication between the energy transmitter and the energy receiver may be supported (e.g., or to charge a power source included in or connected to the energy receiver). In the example of FIG. 4, the energy harvesting intervals 450 are depicted, for clarity, as occurring during periods of time in which information signals are not being transmitted by the energy transmitter. In some examples, however, the energy receiver may harvest the energy of information signals. Accordingly, the periods of time during which the energy transmitter transmits information signals may be examples of energy harvesting intervals during which information signals are used to jointly transfer information and provide energy for energy harvesting. In some examples, one or more of the energy harvesting intervals 450 may be excluded from the communication sequence, for example, if the energy receiver is the second type of energy receiver that includes or is connected to a power source.

The signaling 405 may include a select signal 420 that the energy transmitter may transmit to the energy receiver. The select signal 420 may be an example of a select signal 225 described with reference to FIG. 2. For example, the select signal 420 may include an ER-ID or an ER-ID prefix corresponding to the energy receiver. Accordingly, the select signal 420 may select the energy receiver (e.g., along with one or more other energy receivers having ER-IDs or ER-IDs prefixes included in the select signal 420) for participation in one or more probing sessions 445.

A probing session 445 may encompass the transmission of a query signal 425 (e.g., a query signal 230) and one or more probing signals 430 (e.g., probing signals 235) in response to which the energy receiver may transmit CSI signals 435 (e.g., CSI signals 240) to communicate CSI to the energy transmitter. For example, the energy transmitter may transmit a query signal 425-a that indicates for the energy receiver to participate in a probing session 445-a. That is, the query signal 425-a may select one or more energy receivers, including the energy receiver, of the energy receivers selected by the select signal 420 to provide CSI feedback (e.g., transmit CSI signals 435) to the energy transmitter in response to one or more probing signals 430 transmitted (e.g., broadcast) to the selected one or more energy receivers.

In some examples, each probing signal 430 transmitted after the query signal 425-a and before transmission of another signal different from a probing signal 430 (e.g., a next query signal 425, a data signal 440, a next select signal 420) may be included in the probing session 445-a. The energy receiver may be configured to transmit a CSI signal 435 in response to each of the probing signals 430 included in a given probing session 445 and in accordance with a configuration indicated by the query signal 425 associated with the probing session (e.g., the query signal 425-a).

In some examples, the energy transmitter may be configured to transmit the query signal 425-a after an energy harvesting interval 450 that occurs after transmitting the select signal 420. For example, between transmitting the select signal 420 and the query signal 425-a, the energy transmitter may transmit an energy signal 415 that may be harvested by the energy receiver. The energy transmitter may transmit the energy signal 415 between the select signal 420 and the query signal 425-a for a duration $t_1$ (e.g., a duration of the energy harvesting interval between the select signal 420 and the query signal 425-a may be $t_1$). The transmission of the energy signal 415 for the duration $t_1$ may provide energy (e.g., power) and time to the energy receiver for processing the select signal 420 (e.g., powering components of the energy receiver to process the select signal 420), receiving the query signal 425-a (e.g., powering components of the energy receiver to receive the query signal 425-a), or both. In some examples, a value for the duration $t_1$ may be defined, configured by the energy transmitter, or otherwise stored at the energy receiver.

In the example of FIG. 4, a query signal 425 may indicate for the energy receiver to communicate CSI to the energy transmitter by reflecting a probing signal 430. For example, the query signal 425-a may indicate for the energy receiver to communicate a CSI signal 435 that corresponds to a reflection of a probing signal 430 transmitted during the probing session 445-a. In the example of FIG. 4, the energy transmitter may transmit a probing signal 430-a and a probing signal 430-b during the probing session 445-a (although the energy transmitter may support the transmission of any quantity of probing signals 430 during a given probing session 445). In accordance with the configuration indicated by the query signal 425-a, the energy receiver may transmit a CSI signal 435-a in response to the probing signal 430-a that corresponds to a reflection (e.g., a backscattered reflection) of the probing signal 430-a and may transmit a CSI signal 435-b in response to the probing signal 430-b that corresponds to a reflection of the probing signal 430-b.

The CSI signal 435-a may be indicative of first CSI, and the CSI signal 435-b may be indicative of second CSI. For example, the energy transmitter may transmit the probing signal 430-a using a first set of beamforming parameters, a first set of precoding parameters, or a combination thereof, and may transmit the probing signal 430-b using a second set of beamforming parameters, a second set of precoding parameters or a combination thereof. In some examples, the first set of beamforming parameters may be the same as or different from the second set of beamforming parameters, the first set of precoding parameters may be the same as or different from the second set of precoding parameters, or a combination thereof may be supported. One or more measurements of the reflected probing signal 430-a (e.g., the CSI signal 435-a) may be indicative of the first CSI. For example, the energy transmitter may measure a received power of the reflected probing signal 430-a, an amplitude of the reflected probing signal 430-a, a phase of the reflected probing signal 430-a, or a combination thereof, to determine a sequence of one or more bits that represent the first CSI. For instance, the energy transmitter may sample a measured received power, amplitude, or phase of the reflected probing signal 430-a one or more times over the duration of the reflected probing signal 430-a to determine the sequence of one or more bits representing the first CSI. Similarly, the energy transmitter may determine the second CSI from one or more measurements of the reflected probing signal 430-b (the CSI signal 435-b).

In some examples, the energy transmitter may be configured to transmit the probing signal 430-a after an energy harvesting interval 450 that occurs after transmitting the query signal 425-a. For example, between transmitting the query signal 425-a and the probing signal 430-a, the energy transmitter may transmit an energy signal 415 that may be harvested by the energy receiver. The energy transmitter may transmit the energy signal 415 between the query signal 425-a and the probing signal 430-a for a duration $t_2$ (e.g., a duration of the energy harvesting interval between the query signal 425-a and the probing signal 430-a may be $t_2$). The transmission of the energy signal 415 for the duration $t_2$ may provide energy and time to the energy receiver for processing the query signal 425-a, receiving the probing signal 430-a, or both. In some examples, a value for the duration $t_2$ may be defined, configured by the energy transmitter, or otherwise stored at the energy receiver.

In some examples, the energy transmitter may initiate one or more additional probing sessions 445 with the energy receiver to communicate additional CSI. For example, the energy transmitter may initiate a probing session 445-b with the energy receiver by transmitting a query signal 425-b. In the example of FIG. 4, the query signal 425-b may indicate for the energy receiver to communicate the additional CSI by reflecting probing signals 430 transmitted during the probing session 445-b (e.g., a probing signal 430-c), although the query signal 425-b may indicate for the energy receiver to communicate the additional CSI according to another configuration supported by the energy receiver (e.g., based on a type of the energy receiver). Accordingly, in response to query signal 425-b and the probing signal 430-c, the energy receiver may transmit a CSI signal 435-c corresponding to a reflection of the probing signal 430-c. The transmission characteristics of the query signal 425-b, the probing signal 430-c, or both, may be based on the CSI communicated during the probing session 445-a. For example, the energy transmitter may transmit the query signal 425-b, the probing signal 430-c, or both, using sets of beamforming parameters and/or precoding parameters that are the same as or different from the parameters used to transmit signals during the probing session 445-a based on the CSI communicated during the probing session 445-a.

In some examples, the energy transmitter may be configured to initiate a new (e.g., additional, subsequent) probing session 445 after an energy harvesting interval 450 that occurs after a last transmitted probing signal 430 of a previous probing session 445. For example, between transmitting the probing signal 430-b (e.g., corresponding to a last probing signal 430 of the probing session 445-a) and the query signal 425-b (e.g., corresponding to a start of the probing session 445-b), the energy transmitter may transmit an energy signal 415 that may be harvested by the energy receiver. The energy transmitter may transmit the energy signal 415 between the probing signal 430-b and the query signal 425-b for a duration $t_3$ (e.g., a duration of the energy harvesting interval between the probing signal 430-*b* and the query signal 425-*b* may be $t_3$). The transmission of the energy signal 415 for the duration $t_3$ may provide energy to the energy receiver for receiving the query signal 425-*b* (e.g., may charge the energy receiver such that the energy receiver may receive and process the query signal 425-*b*). In some examples, a value for the duration $t_3$ may be defined, configured by the energy transmitter, or otherwise stored at the energy receiver.

The energy transmitter and the energy receiver may communicate signaling based on the CSI. For example, the energy transmitter may transmit a data signal 440 (e.g., a data signal 245) to the energy receiver using a beam whose parameters (e.g., weights) are based on the CSI, a set of precoding parameters selected based on the CSI, or both. The energy receiver may receive the data signal 440 using a beam whose parameters are based on the CSI, a set of precoding parameters selected based on the CSI, or both. In some examples, the energy receiver may transmit data signals 440 (not shown) to the energy transmitter based on the CSI, and the energy transmitter may receive the data signals 440 based on the CSI.

Figure 5:
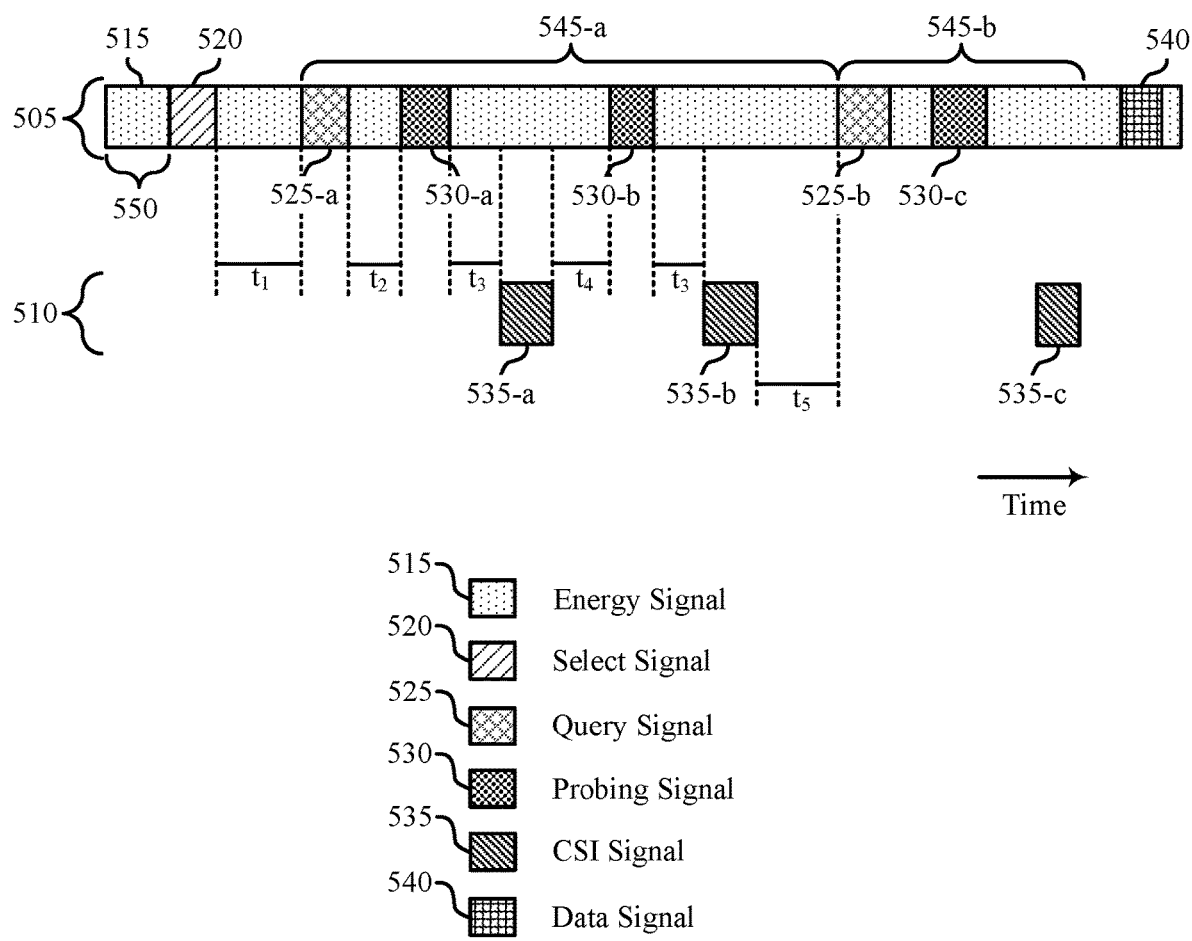

FIG. 5 illustrates an example of a communication sequence 500 that supports techniques for communicating CSI for energy transfer operations in accordance with one or more aspects of the present disclosure. The communication sequence 500 may implement or be implemented by aspects of the wireless communications systems 100, 200, and 300 described with reference to FIGS. 1 through 3, respectively. For example, the communication sequence 500 may be implemented by an energy transmitter and an energy receiver described with reference to FIGS. 1 through 3 to support the communication of CSI between the energy transmitter and the energy receiver.

The communication sequence 500 includes signaling 505 and signaling 510 that are communicated between the energy transmitter and the energy receiver. The signaling 505 may correspond to signaling that is transmitted from the energy transmitter to the energy receiver. The signaling 510 may correspond to signaling that is transmitted from the energy receiver to the energy transmitter.

The signaling 505 may include an energy signal 515 transmitted by the energy transmitter during one or more energy harvesting intervals 550, which may be examples of energy harvesting intervals 450 described with reference to FIG. 4. The energy signal 515 may be an example of an energy signal 220 or an energy signal 415 described with reference to FIGS. 2 and 4, respectively. For example, the energy signal 515 may be harvested by the energy receiver to power one or more components of the energy receiver such that communication between the energy transmitter and the energy receiver may be supported (e.g., or to charge a power source included in or connected to the energy receiver). Additionally, as described with reference to FIG. 4, the energy receiver may harvest the energy of information signals, and the periods of time during which the energy transmitter transmits information signals may be examples of energy harvesting intervals during which information signals are used to jointly transfer information and provide energy for energy harvesting. In some examples, one or more of the energy harvesting intervals 550 may be excluded from the communication sequence, for example, if the energy receiver is the second type of energy receiver that includes or is connected to a power source.

The signaling 505 may include a select signal 520 that the energy transmitter may transmit to the energy receiver. The select signal 520 may be an example of a select signal 225 or a select signal 420 described with reference to FIGS. 2 and 4, respectively. For example, the select signal 520 may include an ER-ID or an ER-ID prefix corresponding to the energy receiver and may select the energy receiver (e.g., along with one or more other energy receivers having ER-IDs or ER-IDs prefixes included in the select signal 520) for participation in one or more probing sessions 545.

The energy transmitter may transmit a query signal 525-*a* (e.g., a query signal 230, a query signal 425) that indicates for the energy receiver to participate in a probing session 545-*a*, which may be an example of a probing session 445 described with reference to FIG. 4. In some examples, the energy transmitter may be configured to transmit the query signal 525-*a* after an energy harvesting interval 550 that occurs after transmitting the select signal 520. For example, between transmitting the select signal 520 and the query signal 525-*a*, the energy transmitter may transmit an energy signal 515 for a duration $t_1$. The transmission of the energy signal 515 for the duration $t_1$ may provide energy and time to the energy receiver for processing the select signal 520, receiving the query signal 525-*a*, or both. In some examples, a value for the duration $t_1$ may be defined, configured by the energy transmitter, or otherwise stored at the energy receiver.

In the example of FIG. 5, a query signal 525 may indicate for the energy receiver to communicate CSI to the energy transmitter by modulating and reflecting an energy signal 515 transmitted after a given probing signal 530 (e.g., a probing signal 235, a probing signal 430). For example, the query signal 525-*a* may indicate for the energy receiver to communicate a CSI signal 535 that corresponds to a modulated reflection of an energy signal 515 transmitted during the probing session 545-*a* and after a corresponding probing signal 530. In the example of FIG. 5, the energy transmitter may transmit a probing signal 530-*a* and a probing signal 530-*b* during the probing session 545-*a* (although the energy transmitter may support the transmission of any quantity of probing signals 530 during a given probing session 545).

In accordance with the configuration indicated by the query signal 525-*a*, the energy receiver may transmit a CSI signal 535-*a* in response to the probing signal 530-*a* and may transmit a CSI signal 535-*b* in response to the probing signal 530-*b*. The CSI signal 535-*a* may correspond to a modulated reflection of an energy signal 515 transmitted after the probing signal 530-*a* (e.g., and before the probing signal 530-*b*), and the CSI signal 535-*b* may correspond to a modulated reflection of an energy signal 515 transmitted after the probing signal 530-*b* (e.g., and before transmission of a next information signal). In some examples, the energy transmitter may be configured to transmit the probing signal 530-*a* after an energy harvesting interval 550 that occurs after transmitting the query signal 525-*a*. For example, between transmitting the query signal 525-*a* and the probing signal 530-*a*, the energy transmitter may transmit an energy signal 515 for a duration $t_2$, which may provide energy and time to the energy receiver for processing the query signal 525-*a*, receiving the probing signal 530-*a*, processing the probing signal 530-*a*, or a combination thereof. In some examples, a value for the duration $t_2$ may be defined, configured by the energy transmitter, or otherwise stored at the energy receiver.

The CSI signal 535-*a* may be indicative of first CSI, and the CSI signal 535-*b* may be indicative of second CSI. For example, the energy transmitter may transmit the probing signal 530-*a* using a first set of beamforming parameters, a first set of precoding parameters, or a combination thereof, and may transmit the probing signal 530-*b* using a second set of beamforming parameters, a second set of precoding parameters or a combination thereof. The energy receiver may measure the probing signal 530-*a* to determine the first CSI and may measure the probing signal 530-*b* to determine the second CSI. To indicate the first CSI via a reflected energy signal 515, the energy receiver may modulate the energy signal 515 (e.g., using a modulator 355) such that the modulation of the reflection of the energy signal 515 indicates the first CSI to the energy transmitter. For example, the energy receiver may modulate an amplitude, a phase, or a combination thereof, of the energy signal 515 received after the probing signal 530-*a* such that the modulated characteristics of the energy signal 515 indicate a sequence of one or more bits to the energy transmitter that represent the first CSI. The energy receiver may reflect (e.g., backscatter, transmit) the modulated energy signal 515 to the energy transmitter. Similarly, to indicate the second CSI via a reflected energy signal 515, the energy receiver may modulate the energy signal 515 received after the probing signal 530-*b* such that the modulation of the reflection of the energy signal 515 indicates the second CSI.

In some examples, the energy receiver may be configured to transmit a modulated reflection of a probing signal 530 after an energy harvesting interval 550 that occurs after receiving the probing signal 530. For example, between receiving each probing signal 530 and transmitting each CSI signal 535, the energy receiver may receive an energy signal 515 for a duration $t_3$, which may provide energy and time to the energy receiver for processing the probing signal 530 (e.g., determining corresponding CSI), modulating an energy signal 515 in accordance with determined CSI, transmitting the modulated reflection of the energy signal 515, or a combination thereof. In some examples, a value for the duration $t_3$ may be defined, configured by the energy transmitter, or otherwise stored at the energy receiver.

In some examples, the energy transmitter may be configured to transmit a next probing signal 530 of a given probing session 545 after a duration (e.g., an energy harvesting interval 550) that occurs after receiving a given CSI signal 535. For example, between receiving the CSI signal 535-*a* and transmitting the probing signal 530-*b*, the energy transmitter may wait for a duration $t_4$ before transmitting the probing signal 530-*b*, which may provide time to the energy transmitter for processing the CSI signal 535-*a* (e.g., decoding the first CSI), determining beamforming parameters, precoding parameters, or both, for transmission of the probing signal 530-*b*, or a combination thereof. In some examples, the energy transmitter may transmit an energy signal 515 during the duration $t_4$. In some examples, a value for the duration $t_4$ may be defined, configured by the energy transmitter, or otherwise stored at the energy receiver.

In some examples, the energy transmitter may initiate one or more additional probing sessions 545 with the energy receiver to communicate additional CSI. For example, the energy transmitter may initiate a probing session 545-*b* with the energy receiver by transmitting a query signal 525-*b*. In the example of FIG. 5, the query signal 525-*b* may indicate for the energy receiver to communicate the additional CSI by modulating and reflecting energy signals 515 transmitted during the probing session 545-*b* based on CSI determined from a probing signal 530 transmitted during the probing session 545-*b*, although the query signal 525-*b* may indicate for the energy receiver to communicate the additional CSI according to another configuration supported by the energy receiver (e.g., based on a type of the energy receiver). Accordingly, in response to query signal 525-*b* and the probing signal 530-*c*, the energy receiver may determine the additional CSI based on the probing signal 530-*c* and transmit a CSI signal 535-*c* (e.g., after a duration $t_3$) corresponding to a reflection of an energy signal 515 transmitted after the probing signal 530-*c* that is modulated to indicate the additional CSI. The transmission characteristics of the query signal 525-*b*, the probing signal 530-*c*, or both, may be based on the CSI communicated during the probing session 545-*a*.

In some examples, the energy transmitter may be configured to initiate a new (e.g., additional, subsequent) probing session 545 after a duration (e.g., an energy harvesting interval 550) that occurs after a last transmitted CSI signal 535 of a previous probing session 545. For example, between receiving the CSI signal 535-*b* (e.g., corresponding to a last CSI signal 535 of the probing session 545-*a*) and the query signal 525-*b* (e.g., corresponding to a start of the probing session 545-*b*), the energy transmitter may transmit an energy signal 515 that may be harvested by the energy receiver. The energy transmitter may transmit the energy signal 515 between the CSI signal 535-*b* and the query signal 525-*b* for a duration $t_5$. The transmission of the energy signal 515 for the duration $t_5$ may provide energy to the energy receiver for receiving the query signal 525-*b* (e.g., may charge the energy receiver such that the energy receiver may receive and process the query signal 525-*b*). In some examples, a value for the duration $t_5$ may be defined, configured by the energy transmitter, or otherwise stored at the energy receiver.

The energy transmitter and the energy receiver may communicate signaling based on the CSI. For example, the energy transmitter may transmit a data signal 540 (e.g., a data signal 245, a data signal 440) to the energy receiver using a beam whose parameters (e.g., weights) are based on the CSI, a set of precoding parameters selected based on the CSI, or both. The energy receiver may receive the data signal 540 using a beam whose parameters are based on the CSI, a set of precoding parameters selected based on the CSI, or both. In some examples, the energy receiver may transmit data signals 540 (not shown) to the energy transmitter based on the CSI, and the energy transmitter may receive the data signals 540 based on the CSI.

Figure 6:
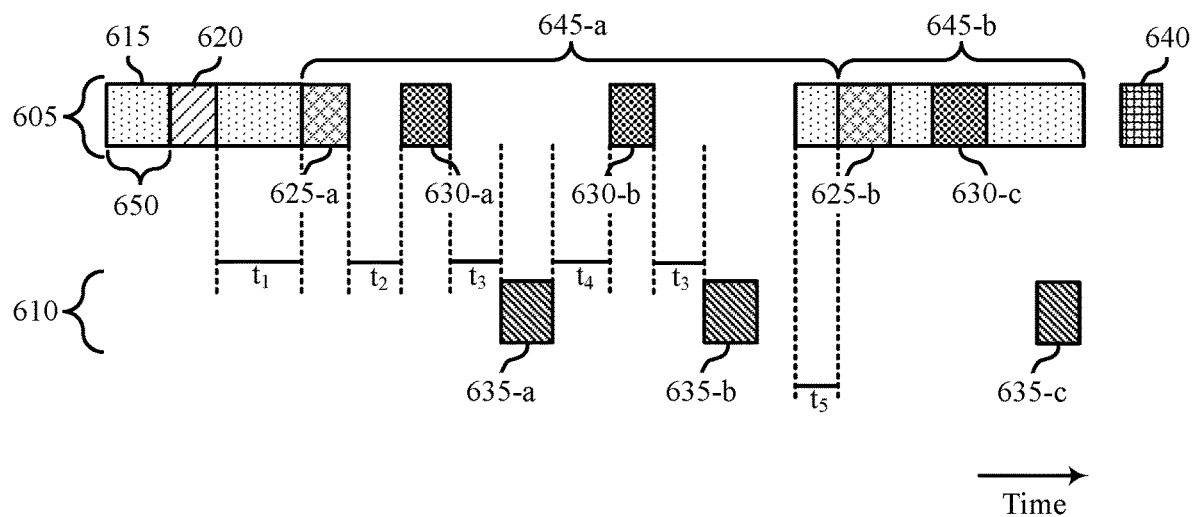
Figure 6:
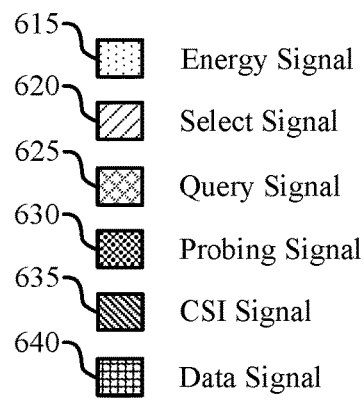

FIG. 6 illustrates an example of a communication sequence 600 that supports techniques for communicating CSI for energy transfer operations in accordance with one or more aspects of the present disclosure. The communication sequence 600 may implement or be implemented by aspects of the wireless communications systems 100, 200, and 300 described with reference to FIGS. 1 through 3, respectively. For example, the communication sequence 600 may be implemented by an energy transmitter and an energy receiver described with reference to FIGS. 1 through 3 to support the communication of CSI between the energy transmitter and the energy receiver.

The communication sequence 600 includes signaling 605 and signaling 610 that are communicated between the energy transmitter and the energy receiver. The signaling 605 may correspond to signaling that is transmitted from the energy transmitter to the energy receiver. The signaling 610 may correspond to signaling that is transmitted from the energy receiver to the energy transmitter.

The signaling 605 may include an energy signal 615 transmitted by the energy transmitter during one or more energy harvesting intervals 650, which may be examples of energy harvesting intervals 450 and 550 described with reference to FIGS. 4 and 5, respectively. The energy signal 615 may be an example of an energy signal 220, an energy signal 415, or an energy signal 515 described with reference to FIGS. 2, 4, and 5, respectively. For example, the energy signal 615 may be harvested by the energy receiver to power one or more components of the energy receiver such that communication between the energy transmitter and the energy receiver may be supported (e.g., or to charge a power source included in or connected to the energy receiver). Additionally, as described with reference to FIGS. 4 and 5, the energy receiver may harvest the energy of information signals, and the periods of time during which the energy transmitter transmits information signals may be examples of energy harvesting intervals during which information signals are used to jointly transfer information and provide energy for energy harvesting.

The signaling 605 may include a select signal 620 that the energy transmitter may transmit to the energy receiver. The select signal 620 may be an example of a select signal 225, a select signal 420, or a select signal 520 described with reference to FIGS. 2, 4, and 5, respectively. For example, the select signal 620 may include an ER-ID or an ER-ID prefix corresponding to the energy receiver and may select the energy receiver (e.g., along with one or more other energy receivers having ER-IDs or ER-IDs prefixes included in the select signal 620) for participation in one or more probing sessions 645.

The energy transmitter may transmit a query signal 625-a (e.g., a query signal 230, a query signal 425, a query signal 525) that indicates for the energy receiver to participate in a probing session 645-a, which may be an example of a probing session 445 or 545 described with reference to FIGS. 4 and 5, respectively. In some examples, the energy transmitter may be configured to transmit the query signal 625-a after an energy harvesting interval 650 that occurs after transmitting the select signal 620. For example, between transmitting the select signal 620 and the query signal 625-a, the energy transmitter may transmit an energy signal 615 for a duration $t_1$. The transmission of the energy signal 615 for the duration $t_1$ may provide energy and time to the energy receiver for processing the select signal 620, receiving the query signal 625-a, or both. In some examples, the energy harvested from the energy signal 615 may be used to charge a power source included in or connected to the energy receiver (e.g., a battery 360). In some examples, a value for the duration $t_1$ may be defined, configured by the energy transmitter, or otherwise stored at the energy receiver.

In the example of FIG. 6, a query signal 625 may indicate for the energy receiver to communicate CSI to the energy transmitter by transmitting a feedback message that includes the CSI. For example, the query signal 625-a may indicate for the energy receiver to communicate a CSI signal 635 that corresponds to a feedback message generated by the energy receiver and including the CSI. In some examples, the energy transmitter may indicate for the energy receiver to transmit the feedback message based on the energy receiver being a second type of energy receiver that includes or is connected to a power source (e.g., a battery 360). For example, based on being the second type of energy receiver, the energy receiver may be capable of generating and transmitting the feedback message. The query signal 625-a may indicate a waveform that the energy receiver is to use to transmit the feedback message. In this way, the energy receiver may encode and transmit the feedback message such that the energy transmitter is able to decode the feedback message and determine the CSI.

In the example of FIG. 6, the energy transmitter may transmit a probing signal 630-a and a probing signal 630-b during the probing session 645-a (although the energy transmitter may support the transmission of any quantity of probing signals 630 during a given probing session 645). In some examples, the energy transmitter may not transmit an energy signal 615 during one or more periods of a probing session 645 (e.g., or one or more other periods of the signaling 605). For example, because the energy receiver is of the second type, the energy receiver may have sufficient power stored to process signals received, determine CSI, generate feedback messages, and transmit CSI signals 635 during the probing session 645 (e.g., or another period of the signaling 605 and the signaling 610) without harvesting energy from an energy signal 615. In some examples, the energy transmitter may transmit an energy signal 615 during a probing session 645, for example, to charge the power source associated with the energy receiver.

In accordance with the configuration indicated by the query signal 625-a, the energy receiver may transmit a CSI signal 635-a in response to the probing signal 630-a and may transmit a CSI signal 635-b in response to the probing signal 630-b. The CSI signal 635-a may correspond to a first feedback message including CSI determined (e.g., generated) based on the probing signal 630-a, and the CSI signal 635-b may correspond to a second feedback message including CSI determined based on the probing signal 630-b. In some examples, the energy transmitter may be configured to transmit the probing signal 630-a after a duration that occurs after transmitting the query signal 625-a. For example, the energy transmitter may wait for a duration $t_2$ between transmitting the query signal 625-a and the probing signal 630-a, which may provide time to the energy receiver for processing the query signal 625-a (e.g., and determining to receiver the probing signal 630-a). In some examples, a value for the duration $t_2$ may be defined, configured by the energy transmitter, or otherwise stored at the energy receiver.

The CSI signal 635-a may be indicative of first CSI, and the CSI signal 635-b may be indicative of second CSI. For example, the energy transmitter may transmit the probing signal 630-a using a first set of beamforming parameters, a first set of precoding parameters, or a combination thereof, and may transmit the probing signal 630-b using a second set of beamforming parameters, a second set of precoding parameters or a combination thereof. The energy receiver may measure the probing signal 630-a to determine the first CSI and may measure the probing signal 630-b to determine the second CSI. To indicate the first CSI via the CSI signal 635-a (e.g., the first feedback message), the energy receiver may generate and encode the CSI signal 635-a such that the energy transmitter may determine the first CSI based on decoding the CSI signal 635-a. Similarly, to indicate the second CSI via the CSI signal 635-b (e.g., the second feedback message), the energy receiver may generate and encode the CSI signal 635-b such that the energy transmitter may determine the second CSI based on decoding the CSI signal 635-b.

In some examples, the energy receiver may be configured to transmit a CSI signal 635 after a duration that occurs after receiving a probing signal 630. For example, between receiving each probing signal 630 and transmitting each CSI signal 635, the energy receiver may wait for a duration $t_3$, which may provide time to the energy receiver for processing the probing signal 630 (e.g., determining corresponding CSI) and generating the CSI signal 635 to indicate the determined CSI, or a combination thereof. In some examples, a value for the duration $t_3$ may be defined, configured by the energy transmitter, or otherwise stored at the energy receiver.

In some examples, the energy transmitter may be configured to transmit a next probing signal 630 of a given probing session 645 after a duration that occurs after receiving a given CSI signal 635. For example, between receiving the CSI signal 635-a and transmitting the probing signal 630-b, the energy transmitter may wait for a duration $t_4$ before transmitting the probing signal 630-b, which may provide time to the energy transmitter for processing the CSI signal 635-a (e.g., decoding the first CSI), determining beamforming parameters, precoding parameters, or both, for transmission of the probing signal 630-b, or a combination thereof. In some examples, a value for the duration $t_4$ may be defined, configured by the energy transmitter, or otherwise stored at the energy receiver.

In some examples, the energy transmitter may initiate one or more additional probing sessions 645 with the energy receiver to communicate additional CSI. For example, the energy transmitter may initiate a probing session 645-b with the energy receiver by transmitting a query signal 625-b. In the example of FIG. 6, the query signal 625-b may indicate for the energy receiver to communicate the additional CSI by transmitting a feedback message including the additional CSI, although the query signal 625-b may indicate for the energy receiver to communicate the additional CSI according to another configuration supported by the energy receiver (e.g., based on a type of the energy receiver). Accordingly, in response to query signal 625-b and the probing signal 630-c, the energy receiver may determine the additional CSI based on the probing signal 630-c and transmit a CSI signal 635-c (e.g., after a duration $t_3$) corresponding to a feedback message that includes the additional CSI. The transmission characteristics of the query signal 625-b, the probing signal 630-c, or both, may be based on the CSI communicated during the probing session 645-a.

In some examples, the energy transmitter may be configured to transmit an energy signal 615 for a duration prior to a new (e.g., additional, subsequent) probing session 645. For example, before transmitting the query signal 625-b (e.g., and after receiving the CSI signal 635-b corresponding to a last CSI signal 635 associated with the probing session 645-a), the energy transmitter may transmit an energy signal 615 that may be harvested by the energy receiver for a duration $t_5$. The transmission of the energy signal 615 for the duration $t_5$ may provide energy to the energy receiver for receiving the query signal 625-b (e.g., may charge the energy receiver such that the energy receiver may receive and process the query signal 625-b). In some examples, a value for the duration $t_5$ may be defined, configured by the energy transmitter, or otherwise stored at the energy receiver.

The energy transmitter and the energy receiver may communicate signaling based on the CSI. For example, the energy transmitter may transmit a data signal 640 (e.g., a data signal 245, a data signal 440, a data signal 540) to the energy receiver using a beam whose parameters (e.g., weights) are based on the CSI, a set of precoding parameters selected based on the CSI, or both. The energy receiver may receive the data signal 640 using a beam whose parameters are based on the CSI, a set of precoding parameters selected based on the CSI, or both. In some examples, the energy receiver may transmit data signals 640 (not shown) to the energy transmitter based on the CSI, and the energy transmitter may receive the data signals 640 based on the CSI.

Figure 7:
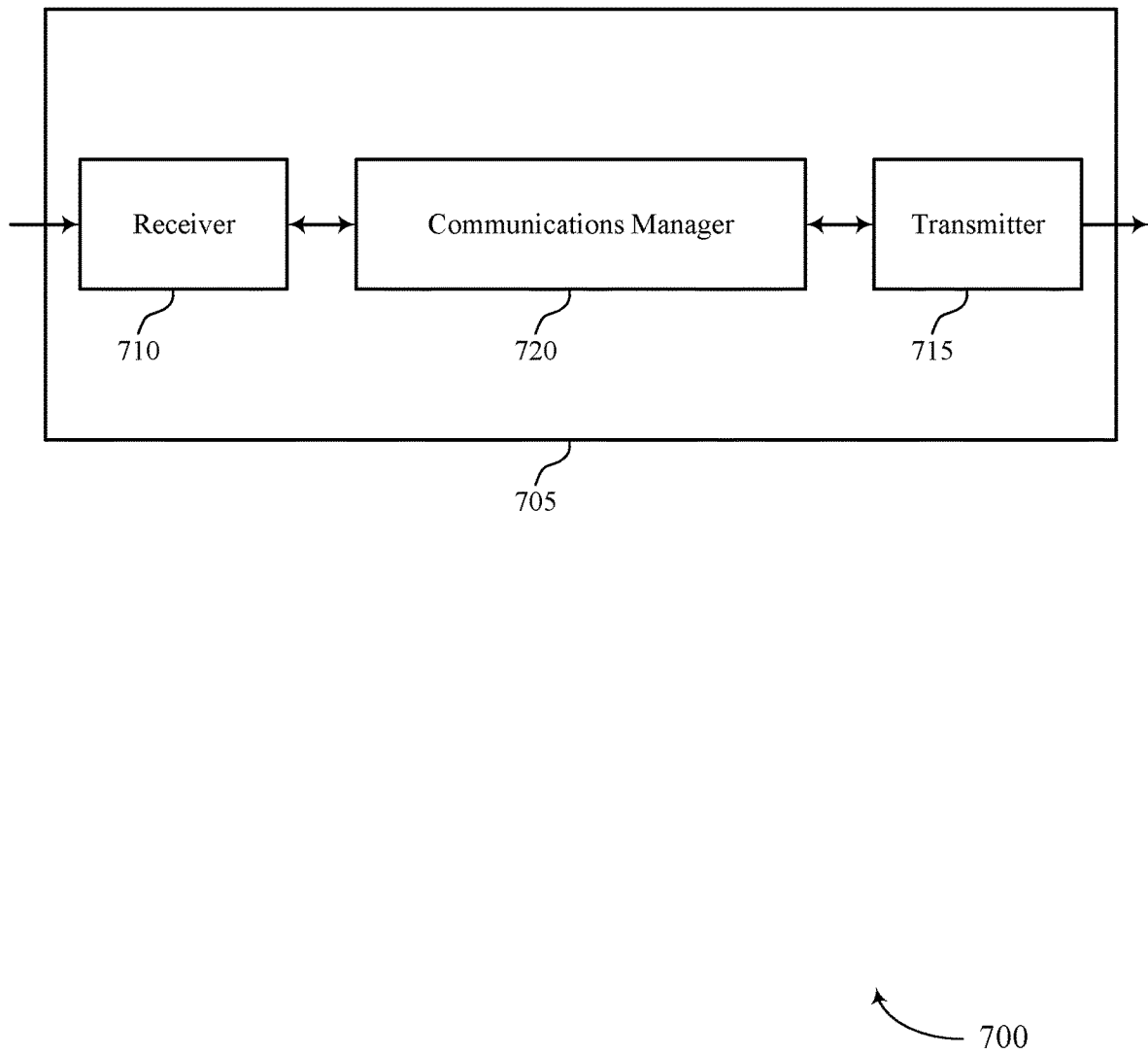
FIGS. 7 and 8 show block diagrams of devices that support techniques for communicating CSI for energy transfer operations in accordance with one or more aspects of the present disclosure.

FIG. 7 shows a block diagram 700 of a device 705 that supports techniques for communicating CSI for energy transfer operations in accordance with one or more aspects of the present disclosure. The device 705 may be an example of aspects of an energy transmitter device or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations thereof or various components thereof may be examples of means for performing various aspects of techniques for communicating CSI for energy transfer operations as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at an energy transmitter device in accordance with examples as disclosed herein. For example, the communications manager 720 may be configured as or otherwise support a means for transmitting an energy signal to an energy receiver device via a channel, the energy signal providing energy from the energy transmitter device for energy harvesting at the energy receiver device during one or more energy harvesting intervals. The communications manager 720 may be configured as or otherwise support a means for transmitting, to the energy receiver device, a first signal. The communications manager 720 may be configured as or otherwise support a means for receiving, from the energy receiver device, a second signal from which the energy transmitter device determines CSI of the channel, the CSI based on the first signal. The communications manager 720 may be configured as or otherwise support a means for transmitting, to the energy receiver device, one or more additional signals whose transmission characteristics are based on the CSI.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources, for example, by enabling the communication of CSI between energy transmitter and energy receiver devices, which may support increased communication reliability, beamforming, improved precoding parameter selection, increased throughput and data rates, and reduced latency, among other benefits.

Figure 8:
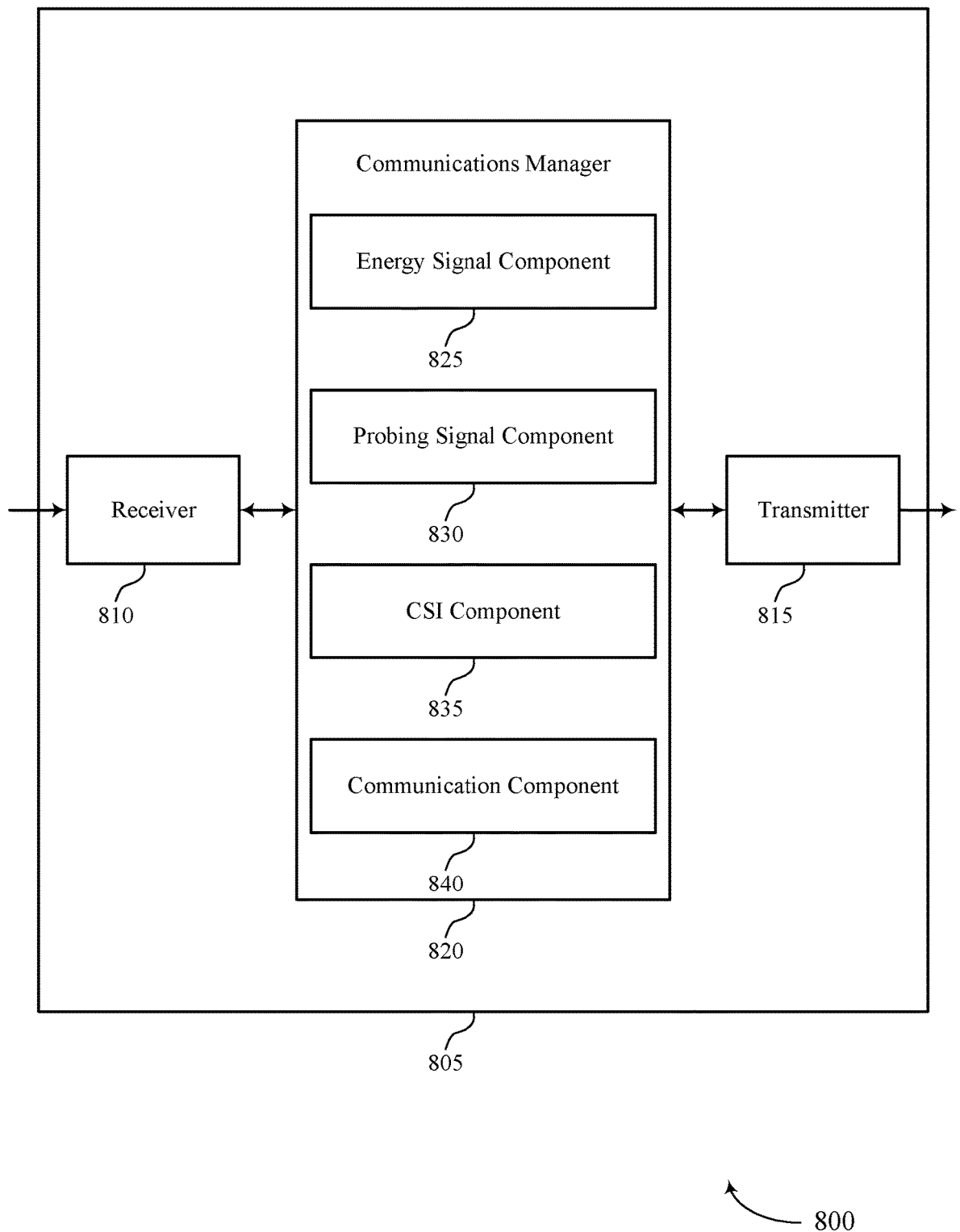

FIG. 8 shows a block diagram 800 of a device 805 that supports techniques for communicating CSI for energy transfer operations in accordance with one or more aspects of the present disclosure. The device 805 may be an example of aspects of a device 705, an energy transmitter device, or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of techniques for communicating CSI for energy transfer operations as described herein. For example, the communications manager 820 may include an energy signal component 825, a probing signal component 830, a CSI component 835, a communication component 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at an energy transmitter device in accordance with examples as disclosed herein. The energy signal component 825 may be configured as or otherwise support a means for transmitting an energy signal to an energy receiver device via a channel, the energy signal providing energy from the energy transmitter device for energy harvesting at the energy receiver device during one or more energy harvesting intervals. The probing signal component 830 may be configured as or otherwise support a means for transmitting, to the energy receiver device, a first signal. The CSI component 835 may be configured as or otherwise support a means for receiving, from the energy receiver device, a second signal from which the energy transmitter device determines CSI of the channel, the CSI based on the first signal. The communication component 840 may be configured as or otherwise support a means for transmitting, to the energy receiver device, one or more additional signals whose transmission characteristics are based on the CSI.

Figure 9:
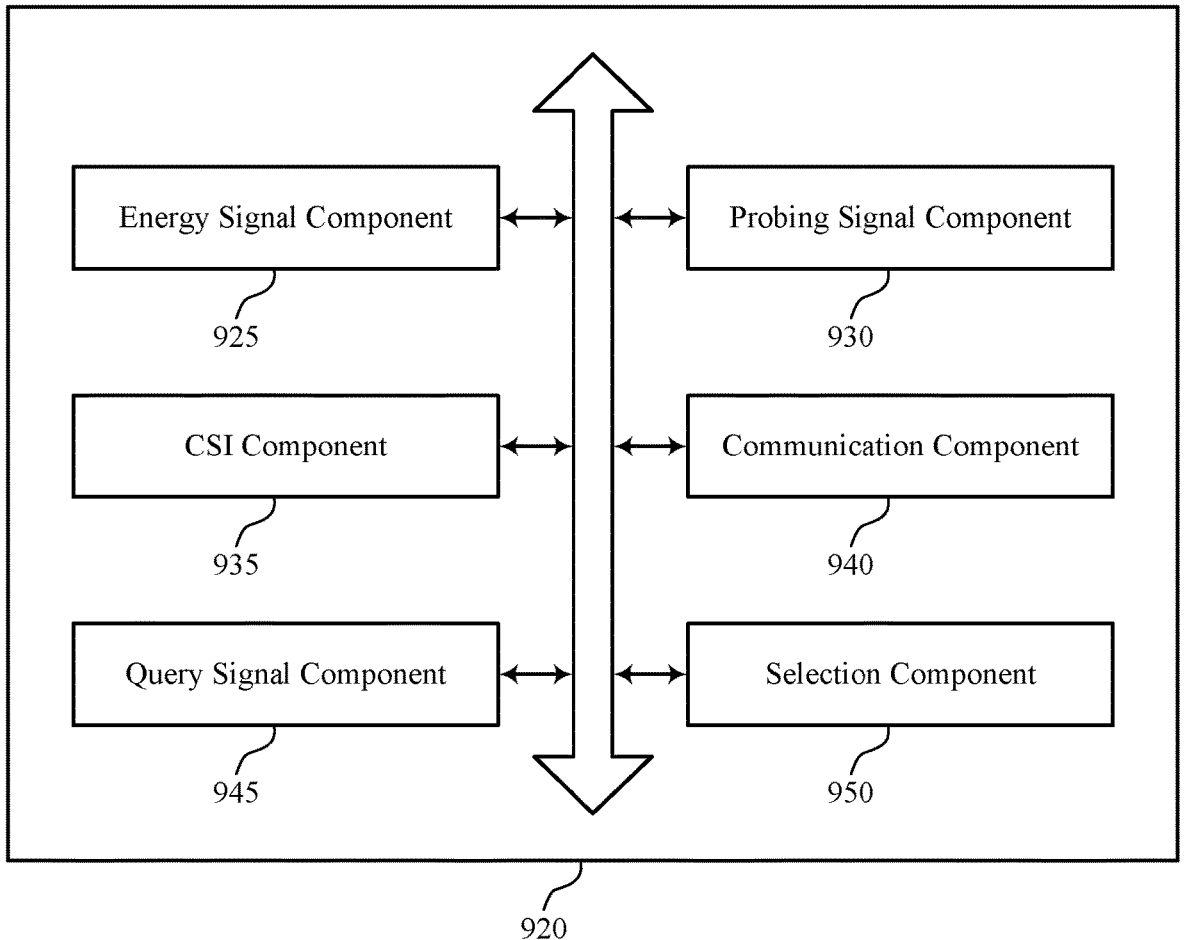
FIG. 9 shows a block diagram of a communications manager that supports techniques for communicating CSI for energy transfer operations in accordance with one or more aspects of the present disclosure.

FIG. 9 shows a block diagram 900 of a communications manager 920 that supports techniques for communicating CSI for energy transfer operations in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for communicating CSI for energy transfer operations as described herein. For example, the communications manager 920 may include an energy signal component 925, a probing signal component 930, a CSI component 935, a communication component 940, a query signal component 945, a selection component 950, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with an energy transmitter device or a network entity 105, between devices, components, or virtualized components associated with an energy transmitter device or a network entity 105), or any combination thereof.

The communications manager 920 may support wireless communication at an energy transmitter device in accordance with examples as disclosed herein. The energy signal component 925 may be configured as or otherwise support a means for transmitting an energy signal to an energy receiver device via a channel, the energy signal providing energy from the energy transmitter device for energy harvesting at the energy receiver device during one or more energy harvesting intervals. The probing signal component 930 may be configured as or otherwise support a means for transmitting, to the energy receiver device, a first signal. The CSI component 935 may be configured as or otherwise support a means for receiving, from the energy receiver device, a second signal from which the energy transmitter device determines CSI of the channel, the CSI based on the first signal. The communication component 940 may be configured as or otherwise support a means for transmitting, to the energy receiver device, one or more additional signals whose transmission characteristics are based on the CSI.

In some examples, the query signal component 945 may be configured as or otherwise support a means for transmitting, to the energy receiver device and before transmitting the first signal, a query signal indicating a configuration of the second signal for indicating the CSI to the energy transmitter device, where the CSI is determined based on the configuration of the second signal.

In some examples, to support receiving the second signal, the CSI component 935 may be configured as or otherwise support a means for receiving a reflection of the first signal received at the energy receiver device based on the configuration of the second signal indicating for the energy receiver device to reflect the first signal, the CSI determined from the second signal based on a measurement of the reflection.

In some examples, to support receiving the second signal, the CSI component 935 may be configured as or otherwise support a means for receiving a modulated reflection of the energy signal received at the energy receiver device during an energy harvesting interval of the one or more energy harvesting intervals that occurs after transmitting the first signal based on the configuration of the second signal indicating for the energy receiver device to modulate and reflect the energy signal received during the energy harvesting interval, the CSI determined from the second signal based on the modulation of the reflection of the energy signal.

In some examples, to support receiving the second signal, the CSI component 935 may be configured as or otherwise support a means for receiving a feedback message including the CSI based on a type of the energy receiver device and the configuration of the second signal indicating a waveform for communicating the CSI.

In some examples, the query signal indicates that the energy receiver device is to communicate the CSI with the energy transmitter device. In some examples, the first signal is transmitted to the energy receiver device and the second signal is received from the energy receiver device based on transmitting the query signal.

In some examples, the first signal is transmitted after an energy harvesting interval of the one or more energy harvesting intervals that occurs after transmitting the query signal.

In some examples, the selection component 950 may be configured as or otherwise support a means for transmitting, to a set of energy receiver devices including the energy receiver device and before transmitting the first signal, a select signal indicating that the set of energy receiver devices is to communicate respective CSI with the energy transmitter device via respective channels, where the first signal is transmitted to the energy receiver device and the second signal is received from the energy receiver device based on transmitting the select signal.

In some examples, the query signal component 945 may be configured as or otherwise support a means for transmitting, to the energy receiver device, a query signal that indicates a configuration of the second signal for indicating the CSI to the energy transmitter device, where the select signal is transmitted before an energy harvesting interval of the one or more energy harvesting intervals that occurs before transmitting the query signal.

In some examples, transmitting the one or more additional signals may include transmitting a third signal (e.g., to support transmitting the one or more additional signals, the communication component 940 may be configured as or otherwise support a means for transmitting a third signal). In some examples, the CSI component 935 may be configured as or otherwise support a means for receiving, from the energy receiver device, a fourth signal from which the energy transmitter device determines second CSI of the channel, the second CSI based on the third signal.

In some examples, the third signal is transmitted after a configured time interval for processing the second signal at the energy transmitter device.

In some examples, to support transmitting the one or more additional signals, the query signal component 945 may be configured as or otherwise support a means for transmitting, to the energy receiver device, a query signal indicating for the energy receiver device to communicate second CSI of the channel with the energy transmitter device. In some examples, the query signal is transmitted after an energy harvesting interval of the one or more energy harvesting intervals that occurs after receiving the second signal.

In some examples, to support transmitting the one or more additional signals, the communication component 940 may be configured as or otherwise support a means for transmitting the one or more additional signals using a beam whose parameters are based on the CSI, a set of precoding parameters that are based on the CSI, or both.

Figure 10:
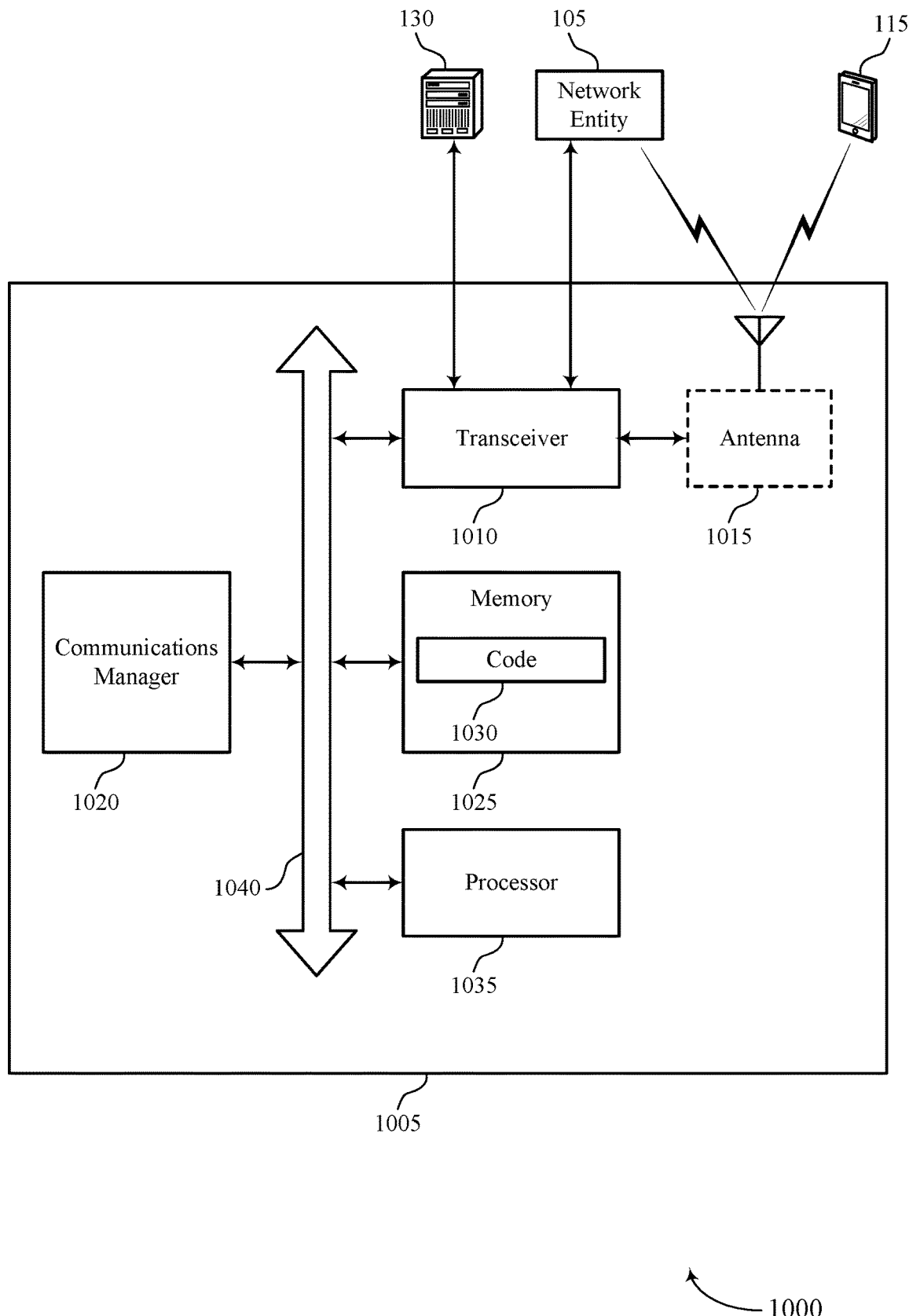
FIG. 10 shows a diagram of a system including a device that supports techniques for communicating CSI for energy transfer operations in accordance with one or more aspects of the present disclosure.

FIG. 10 shows a diagram of a system 1000 including a device 1005 that supports techniques for communicating CSI for energy transfer operations in accordance with one or more aspects of the present disclosure. The device 1005 may be an example of or include the components of a device 705, a device 805, an energy transmitter device, or a network entity 105 as described herein. The device 1005 may communicate with one or more energy transmitter devices, one or more network entities 105, one or more energy receiver devices, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. The transceiver 1010, or the transceiver 1010 and one or more antennas 1015 or wired interfaces, where applicable, may be an example of a transmitter 715, a transmitter 815, a receiver 710, a receiver 810, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1025 may include RAM and ROM. The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a BIOS which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting techniques for communicating CSI for energy transfer operations). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more energy receiver devices or one or more UEs 115. In some examples, the communications manager 1020 may manage communications with other energy transmitter devices or network entities 105, and may include a controller or scheduler for controlling communications with energy receiver devices or UEs 115 in cooperation with other energy transmitter devices or network entities 105. In some examples, the communications manager 1020 may support an X2 interface within an LTE/LTE-A wireless communications network technology to provide communication between energy transmitter devices or network entities 105.

The communications manager 1020 may support wireless communication at an energy transmitter device in accordance with examples as disclosed herein. For example, the communications manager 1020 may be configured as or otherwise support a means for transmitting an energy signal to an energy receiver device via a channel, the energy signal providing energy from the energy transmitter device for energy harvesting at the energy receiver device during one or more energy harvesting intervals. The communications manager 1020 may be configured as or otherwise support a means for transmitting, to the energy receiver device, a first signal. The communications manager 1020 may be configured as or otherwise support a means for receiving, from the energy receiver device, a second signal from which the energy transmitter device determines CSI of the channel, the CSI based on the first signal. The communications manager 1020 may be configured as or otherwise support a means for transmitting, to the energy receiver device, one or more additional signals whose transmission characteristics are based on the CSI.

By including or configuring the communications manager 1020 in accordance with examples as described herein, the device 1005 may support techniques for beamforming between energy transmitter and energy receiver devices, improved precoding parameter selection, increased communication range between energy transmitter and energy receiver devices, increased link budget, increased communication reliability, reduced latency, increased throughput and data rates, reduced power consumption, improved (e.g., more efficient) power harvesting, more efficient utilization of communication resources, improved coordination between devices, and longer battery life, among other benefits.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the processor 1035, the memory 1025, the code 1030, the transceiver 1010, or any combination thereof. For example, the code 1030 may include instructions executable by the processor 1035 to cause the device 1005 to perform various aspects of techniques for communicating CSI for energy transfer operations as described herein, or the processor 1035 and the memory 1025 may be otherwise configured to perform or support such operations.

Figure 11:
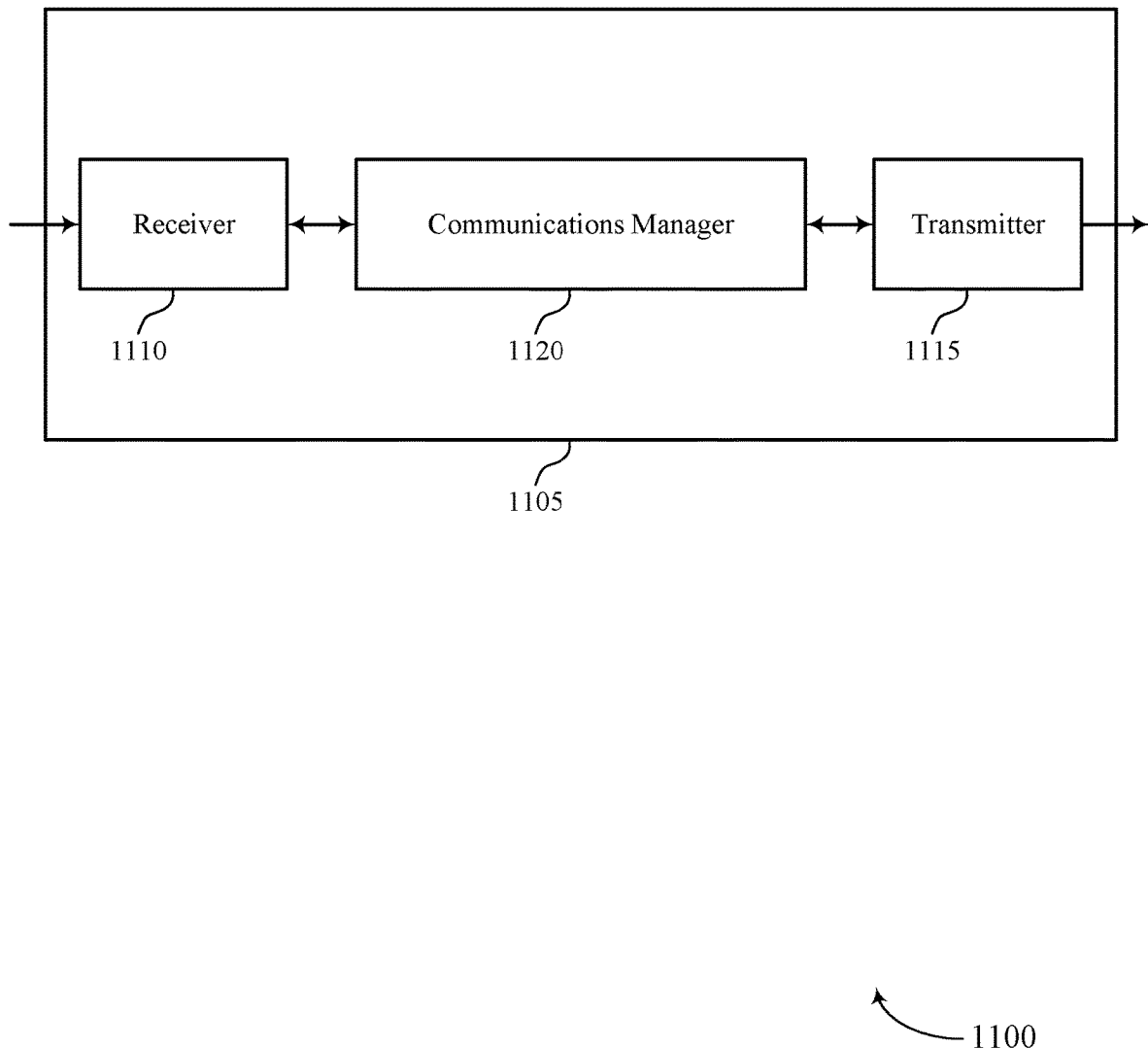
FIGS. 11 and 12 show block diagrams of devices that support techniques for communicating CSI for energy transfer operations in accordance with one or more aspects of the present disclosure.

FIG. 11 shows a block diagram 1100 of a device 1105 that supports techniques for communicating CSI for energy transfer operations in accordance with one or more aspects of the present disclosure. The device 1105 may be an example of aspects of an energy receiver device or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for communicating CSI for energy transfer operations). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for communicating CSI for energy transfer operations). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for communicating CSI for energy transfer operations as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). In some examples, the hardware may be limited, but may also include or more of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at an energy receiver device in accordance with examples as disclosed herein. For example, the communications manager 1120 may be configured as or otherwise support a means for receiving an energy signal from an energy transmitter device via a channel, the energy signal providing energy from the energy transmitter device for energy harvesting at the energy receiver device during one or more energy harvesting intervals. The communications manager 1120 may be configured as or otherwise support a means for receiving, from the energy transmitter device, a first signal. The communications manager 1120 may be configured as or otherwise support a means for transmitting, to the energy transmitter device, a second signal indicative of CSI of the channel, the CSI based on the first signal. The communications manager 1120 may be configured as or otherwise support a means for receiving, from the energy transmitter device, one or more additional signals whose transmission characteristics are based on the CSI.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, and more efficient utilization of communication resources, for example, by enabling the communication of CSI between energy transmitter and energy receiver devices, which may support increased communication reliability, beamforming, improved precoding parameter selection, increased throughput and data rates, and reduced latency, among other benefits.

Figure 12:
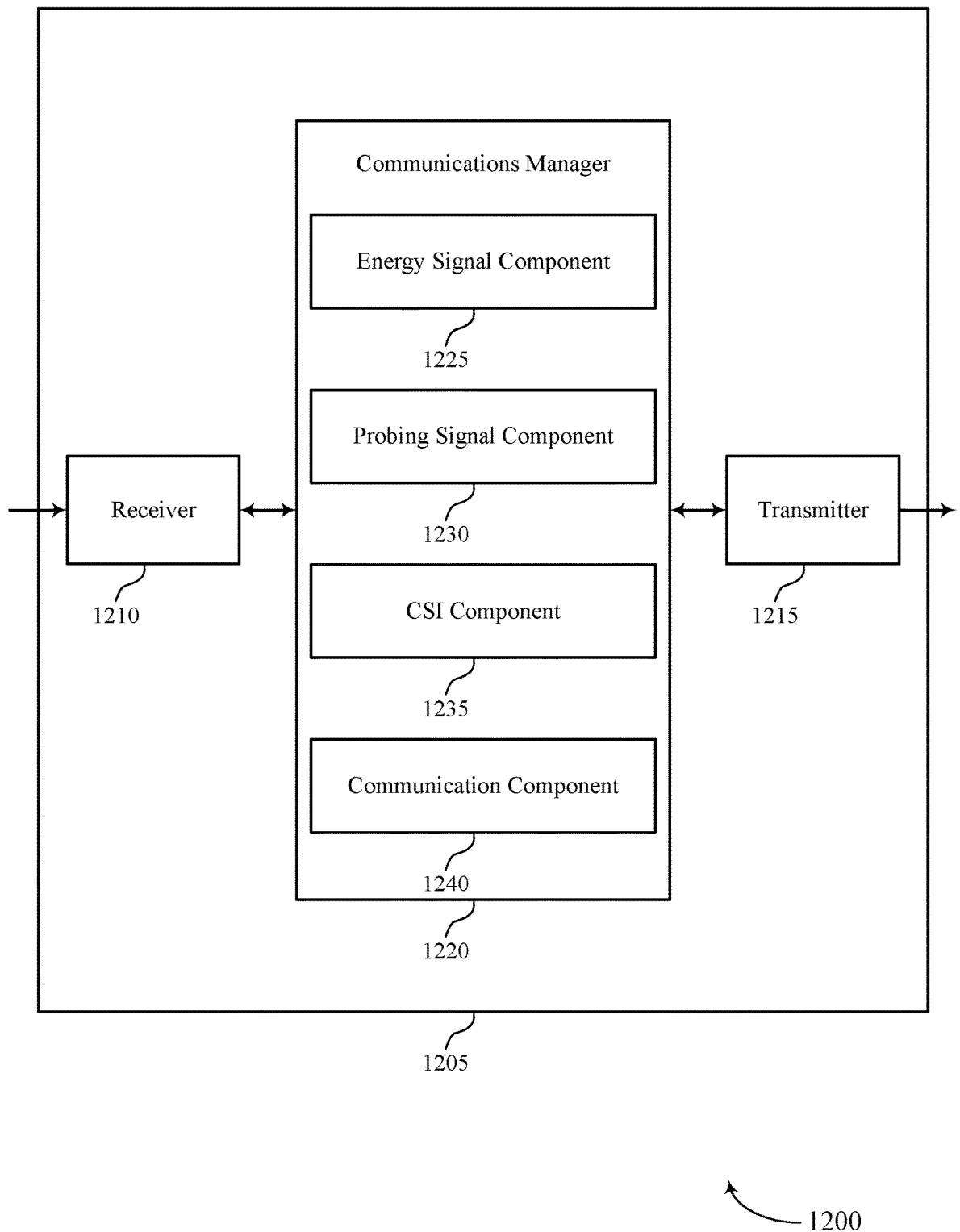

FIG. 12 shows a block diagram 1200 of a device 1205 that supports techniques for communicating CSI for energy transfer operations in accordance with one or more aspects of the present disclosure. The device 1205 may be an example of aspects of a device 1105, an energy receiver device, or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for communicating CSI for energy transfer operations). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for communicating CSI for energy transfer operations). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for communicating CSI for energy transfer operations as described herein. For example, the communications manager 1220 may include an energy signal component 1225, a probing signal component 1230, a CSI component 1235, a communication component 1240, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at an energy receiver device in accordance with examples as disclosed herein. The energy signal component 1225 may be configured as or otherwise support a means for receiving an energy signal from an energy transmitter device via a channel, the energy signal providing energy from the energy transmitter device for energy harvesting at the energy receiver device during one or more energy harvesting intervals. The probing signal component 1230 may be configured as or otherwise support a means for receiving, from the energy transmitter device, a first signal. The CSI component 1235 may be configured as or otherwise support a means for transmitting, to the energy transmitter device, a second signal indicative of CSI of the channel, the CSI based on the first signal. The communication component 1240 may be configured as or otherwise support a means for receiving, from the energy transmitter device, one or more additional signals whose transmission characteristics are based on the CSI.

Figure 13:
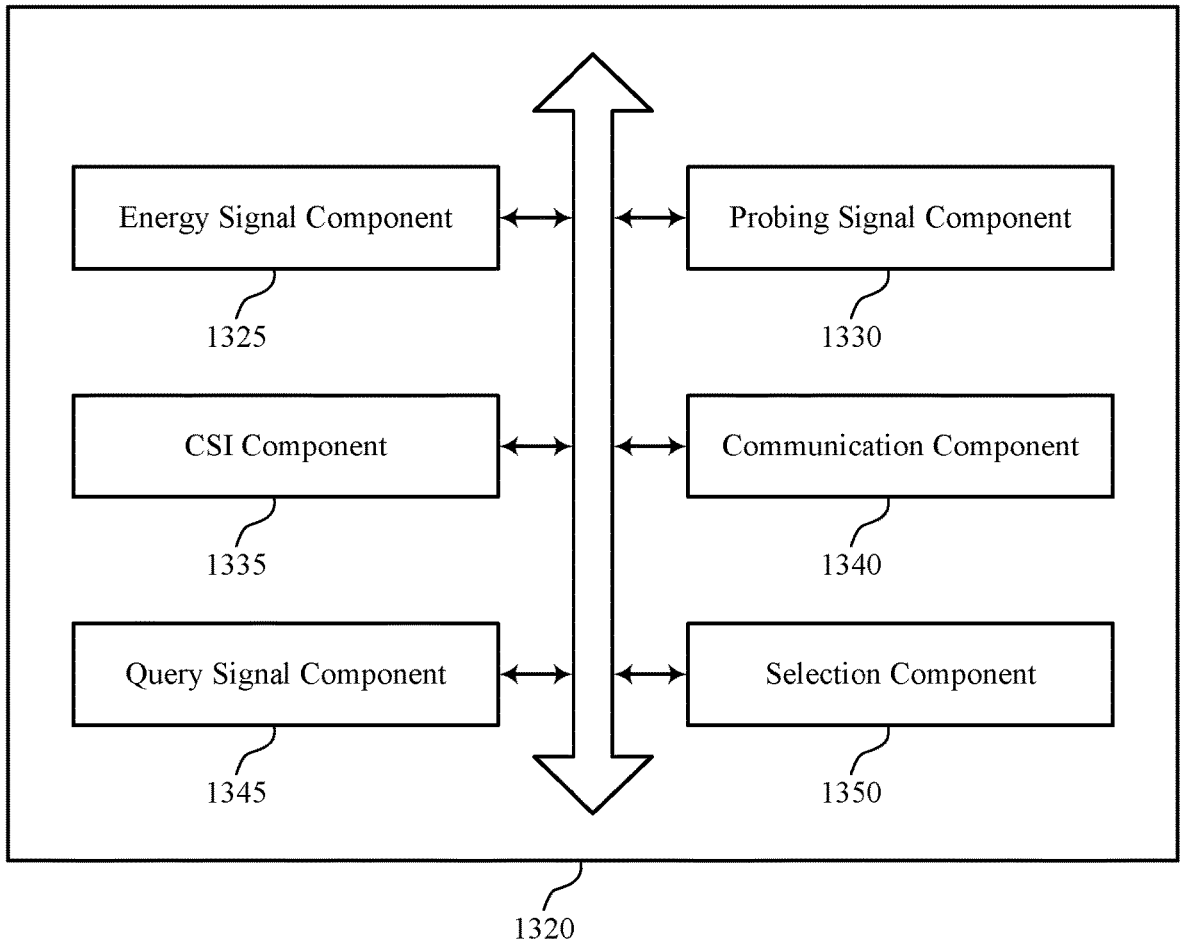
FIG. 13 shows a block diagram of a communications manager that supports techniques for communicating CSI for energy transfer operations in accordance with one or more aspects of the present disclosure.

FIG. 13 shows a block diagram 1300 of a communications manager 1320 that supports techniques for communicating CSI for energy transfer operations in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for communicating CSI for energy transfer operations as described herein. For example, the communications manager 1320 may include an energy signal component 1325, a probing signal component 1330, a CSI component 1335, a communication component 1340, a query signal component 1345, a selection component 1350, or any combination thereof. Each of these components may communicate, directly or indirectly, with one another (e.g., via one or more buses).

The communications manager 1320 may support wireless communication at an energy receiver device in accordance with examples as disclosed herein. The energy signal component 1325 may be configured as or otherwise support a means for receiving an energy signal from an energy transmitter device via a channel, the energy signal providing energy from the energy transmitter device for energy harvesting at the energy receiver device during one or more energy harvesting intervals. The probing signal component 1330 may be configured as or otherwise support a means for receiving, from the energy transmitter device, a first signal. The CSI component 1335 may be configured as or otherwise support a means for transmitting, to the energy transmitter device, a second signal indicative of CSI of the channel, the CSI based on the first signal. The communication component 1340 may be configured as or otherwise support a means for receiving, from the energy transmitter device, one or more additional signals whose transmission characteristics are based on the CSI.

In some examples, the query signal component 1345 may be configured as or otherwise support a means for receiving, from the energy transmitter device and before receiving the first signal, a query signal indicating a configuration of the second signal for indicating the CSI to the energy transmitter device, where the second signal is transmitted in accordance with the configuration of the second signal.

In some examples, to support transmitting the second signal to the energy transmitter device, the CSI component 1335 may be configured as or otherwise support a means for reflecting the first signal back to the energy transmitter device based on the configuration of the second signal indicating for the energy receiver device to reflect the first signal, where a measurement of the reflected first signal is indicative of the CSI.

In some examples, the CSI component 1335 may be configured as or otherwise support a means for determining the CSI based on a measurement of the first signal. In some examples, the CSI component 1335 may be configured as or otherwise support a means for modulating the energy signal received at the energy transmitter device during an energy harvesting interval of the one or more energy harvesting intervals that occurs after receiving the first signal, the energy signal modulated to indicate the CSI. In some examples, to transmit the second signal to the energy transmitter device, the CSI component 1335 may be configured as or otherwise support a means for transmitting the modulated energy signal to the energy transmitter device based on the configuration of the second signal indicating for the energy receiver device to modulate and reflect the energy signal received during the energy harvesting interval.

In some examples, the CSI component 1335 may be configured as or otherwise support a means for determining the CSI based on a measurement of the first signal. In some examples, to transmit the second signal to the energy transmitter device, the CSI component 1335 may be configured as or otherwise support a means for transmitting a feedback message including the CSI based on a type of the energy receiver device and the configuration of the second signal indicating a waveform for communicating the CSI.

In some examples, the query signal indicates that the energy receiver device is to communicate the CSI with the energy transmitter device. In some examples, the first signal is received from the energy transmitter device and the second signal is transmitted to the energy transmitter device based on receiving the query signal.

In some examples, the first signal is received after an energy harvesting interval of the one or more energy harvesting intervals that occurs after receiving the query signal.

In some examples, the selection component 1350 may be configured as or otherwise support a means for receiving, from the energy transmitter device and before receiving the first signal, a select signal indicating that a set of energy receiver devices is to communicate respective CSI with the energy transmitter device via respective channels, the set of energy receiver devices including the energy receiver device, where the first signal is received from the energy transmitter device and the second signal is transmitted to the energy transmitter device based on receiving the select signal.

In some examples, the query signal component 1345 may be configured as or otherwise support a means for receiving, from the energy transmitter device, a query signal that indicates a configuration of the second signal for indicating the CSI to the energy transmitter device, where the select signal is received before an energy harvesting interval of the one or more energy harvesting intervals that occurs before receiving the query signal.

In some examples, the second signal is transmitted after a configured time interval for processing the first signal at the energy receiver device.

In some examples, receiving the one or more additional signals may include receiving a third signal (e.g., to support receiving the one or more additional signals, the communication component 1340 may be configured as or otherwise support a means for receiving a third signal). In some examples, the CSI component 1335 may be configured as or otherwise support a means for transmitting, to the energy transmitter device, a fourth signal indicative of second CSI of the channel, the second CSI based on the third signal.

In some examples, to support receiving the one or more additional signals, the query signal component 1345 may be configured as or otherwise support a means for receiving, from the energy transmitter device, a query signal indicating for the energy receiver device to communicate second CSI of the channel with the energy transmitter device. In some examples, the query signal is received after an energy harvesting interval of the one or more energy harvesting intervals that occurs after transmitting the second signal.

In some examples, to support receiving the one or more additional signals, the communication component 1340 may be configured as or otherwise support a means for receiving the one or more additional signals using a beam whose parameters are based on the CSI.

Figure 14:
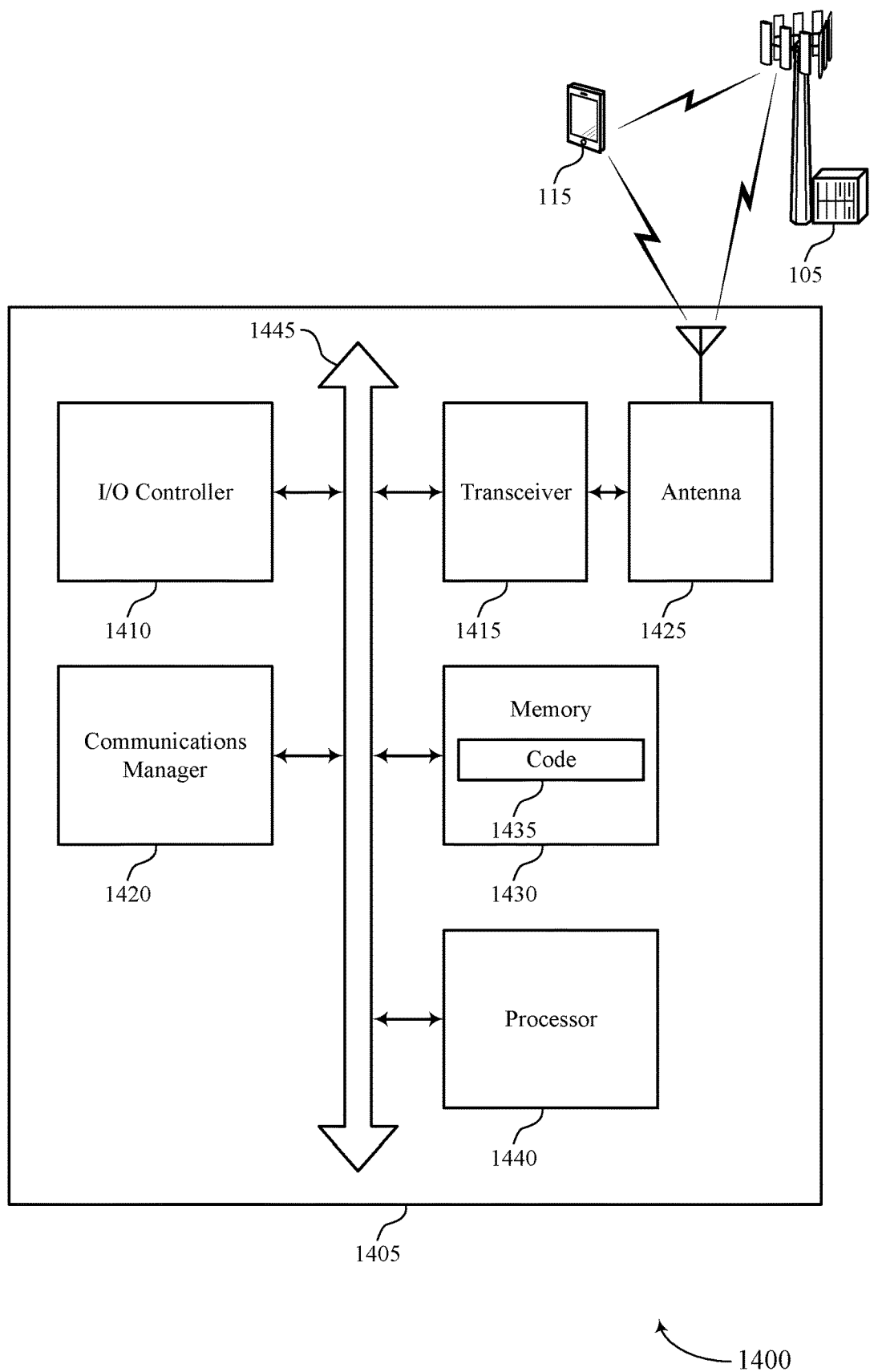
FIG. 14 shows a diagram of a system including a device that supports techniques for communicating CSI for energy transfer operations in accordance with one or more aspects of the present disclosure.

FIG. 14 shows a diagram of a system 1400 including a device 1405 that supports techniques for communicating CSI for energy transfer operations in accordance with one or more aspects of the present disclosure. The device 1405 may be an example of or include the components of a device 1105, a device 1205, an energy receiver device, or a UE 115 as described herein. The device 1405 may communicate (e.g., wirelessly) with one or more energy transmitter devices, one or more network entities 105, one or more UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for communicating CSI for energy transfer operations). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communication at an energy receiver device in accordance with examples as disclosed herein. For example, the communications manager 1420 may be configured as or otherwise support a means for receiving an energy signal from an energy transmitter device via a channel, the energy signal providing energy from the energy transmitter device for energy harvesting at the energy receiver device during one or more energy harvesting intervals. The communications manager 1420 may be configured as or otherwise support a means for receiving, from the energy transmitter device, a first signal. The communications manager 1420 may be configured as or otherwise support a means for transmitting, to the energy transmitter device, a second signal indicative of CSI of the channel, the CSI based on the first signal. The communications manager 1420 may be configured as or otherwise support a means for receiving, from the energy transmitter device, one or more additional signals whose transmission characteristics are based on the CSI.

By including or configuring the communications manager 1420 in accordance with examples as described herein, the device 1405 may support techniques for beamforming between energy transmitter and energy receiver devices, improved precoding parameter selection, increased communication range between energy transmitter and energy receiver devices, increased link budget, increased communication reliability, reduced latency, increased throughput and data rates, reduced power consumption, improved (e.g., more efficient) power harvesting, more efficient utilization of communication resources, improved coordination between devices, and longer battery life, among other benefits.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for communicating CSI for energy transfer operations as described herein, or the processor 1440 and the memory 1430 may be otherwise configured to perform or support such operations.

Figure 15:
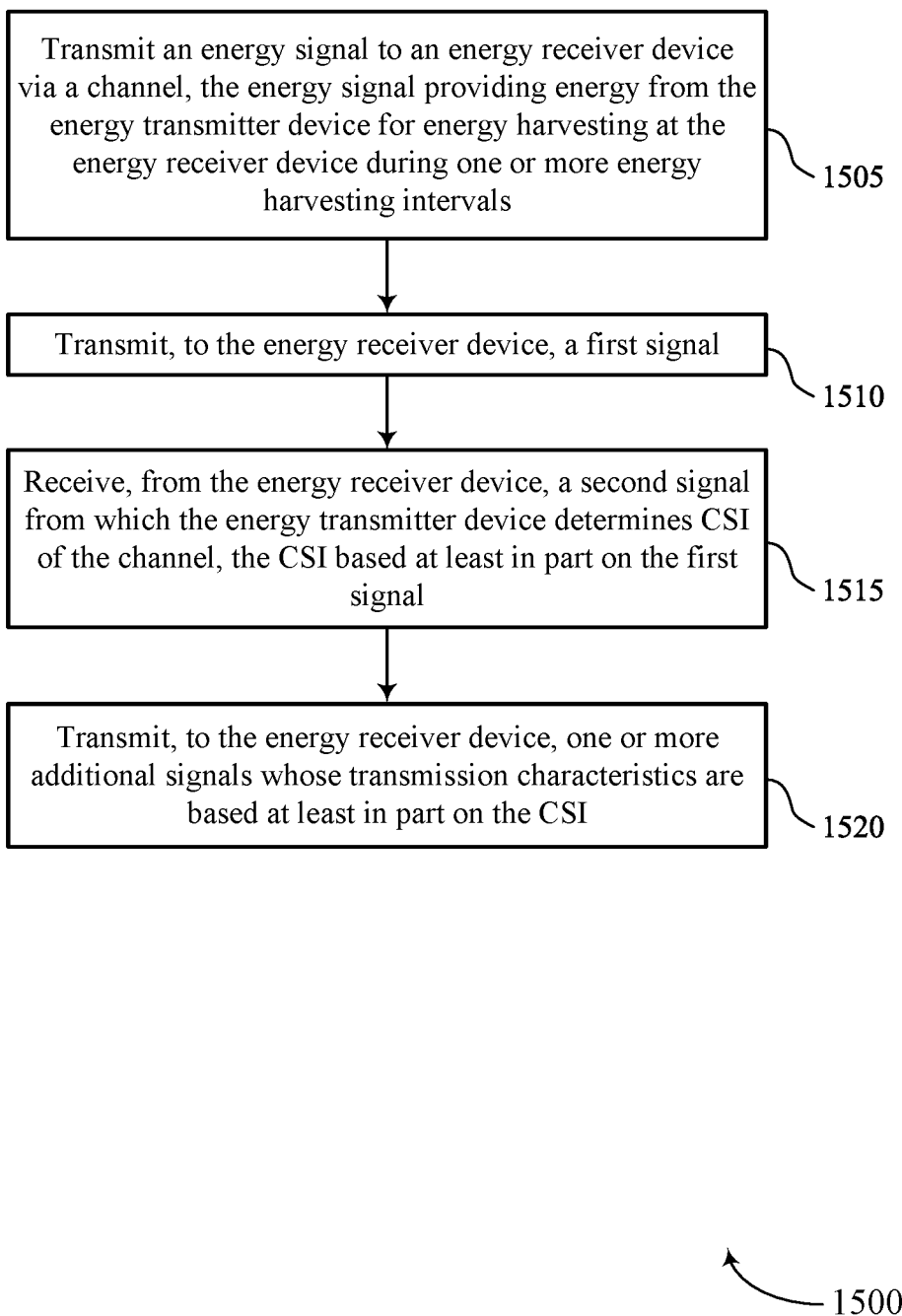
FIGS. 15 through 22 show flowcharts illustrating methods that support techniques for communicating CSI for energy transfer operations in accordance with one or more aspects of the present disclosure.

FIG. 15 shows a flowchart illustrating a method 1500 that supports techniques for communicating CSI for energy transfer operations in accordance with one or more aspects of the present disclosure. The operations of the method 1500 may be implemented by an energy transmitter device or its components as described herein. For example, the operations of the method 1500 may be performed by an energy transmitter device as described with reference to FIGS. 1 through 10. In some examples, an energy transmitter device may execute a set of instructions to control the functional elements of the energy transmitter device to perform the described functions. Additionally, or alternatively, the energy transmitter device may perform aspects of the described functions using special-purpose hardware.

At 1505, the method may include transmitting an energy signal to an energy receiver device via a channel, the energy signal providing energy from the energy transmitter device for energy harvesting at the energy receiver device during one or more energy harvesting intervals. The operations of 1505 may be performed in accordance with examples as disclosed herein. In some examples, aspects of the operations of 1505 may be performed by an energy signal component 925 as described with reference to FIG. 9.

At 1510, the method may include transmitting, to the energy receiver device, a first signal. The operations of 1510 may be performed in accordance with examples as disclosed herein. In some examples, aspects of the operations of 1510 may be performed by a probing signal component 930 as described with reference to FIG. 9.

At 1515, the method may include receiving, from the energy receiver device, a second signal from which the energy transmitter device determines CSI of the channel, the CSI based on the first signal. The operations of 1515 may be performed in accordance with examples as disclosed herein. In some examples, aspects of the operations of 1515 may be performed by a CSI component 935 as described with reference to FIG. 9.

At 1520, the method may include transmitting, to the energy receiver device, one or more additional signals whose transmission characteristics are based on the CSI. The operations of 1520 may be performed in accordance with examples as disclosed herein. In some examples, aspects of the operations of 1520 may be performed by a communication component 940 as described with reference to FIG. 9.

Figure 16:
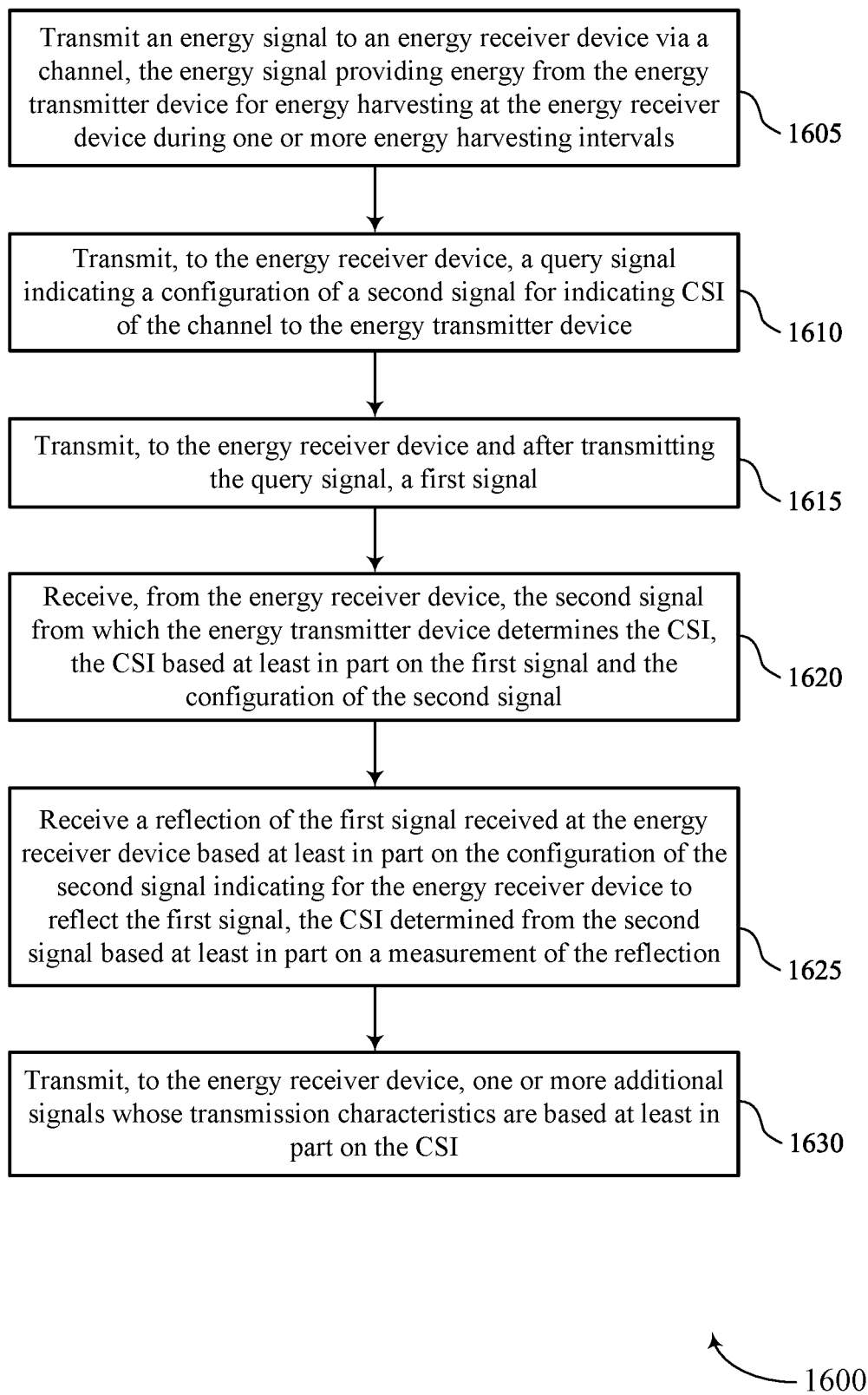

FIG. 16 shows a flowchart illustrating a method 1600 that supports techniques for communicating CSI for energy transfer operations in accordance with one or more aspects of the present disclosure. The operations of the method 1600 may be implemented by an energy transmitter device or its components as described herein. For example, the operations of the method 1600 may be performed by an energy transmitter device as described with reference to FIGS. 1 through 10. In some examples, an energy transmitter device may execute a set of instructions to control the functional elements of the energy transmitter device to perform the described functions. Additionally, or alternatively, the energy transmitter device may perform aspects of the described functions using special-purpose hardware.

At 1605, the method may include transmitting an energy signal to an energy receiver device via a channel, the energy signal providing energy from the energy transmitter device for energy harvesting at the energy receiver device during one or more energy harvesting intervals. The operations of 1605 may be performed in accordance with examples as disclosed herein. In some examples, aspects of the operations of 1605 may be performed by an energy signal component 925 as described with reference to FIG. 9.

At 1610, the method may include transmitting, to the energy receiver device, a query signal indicating a configuration of a second signal for indicating CSI of the channel to the energy transmitter device. The operations of 1610 may be performed in accordance with examples as disclosed herein. In some examples, aspects of the operations of 1610 may be performed by a query signal component 945 as described with reference to FIG. 9.

At 1615, the method may include transmitting, to the energy receiver device and after transmitting the query signal, a first signal. The operations of 1615 may be performed in accordance with examples as disclosed herein. In some examples, aspects of the operations of 1615 may be performed by a probing signal component 930 as described with reference to FIG. 9.

At 1620, the method may include receiving, from the energy receiver device, the second signal from which the energy transmitter device determines the CSI, the CSI based on the first signal and the configuration of the second signal. The operations of 1620 may be performed in accordance with examples as disclosed herein. In some examples, aspects of the operations of 1620 may be performed by a CSI component 935 as described with reference to FIG. 9.

At 1625, to receive the second signal from the energy receiver device, the method may include receiving a reflection of the first signal received at the energy receiver device based on the configuration of the second signal indicating for the energy receiver device to reflect the first signal, the CSI determined from the second signal based on a measurement of the reflection. The operations of 1625 may be performed in accordance with examples as disclosed herein. In some examples, aspects of the operations of 1625 may be performed by a CSI component 935 as described with reference to FIG. 9.

At 1630, the method may include transmitting, to the energy receiver device, one or more additional signals whose transmission characteristics are based on the CSI. The operations of 1630 may be performed in accordance with examples as disclosed herein. In some examples, aspects of the operations of 1630 may be performed by a communication component 940 as described with reference to FIG. 9.

Figure 17:
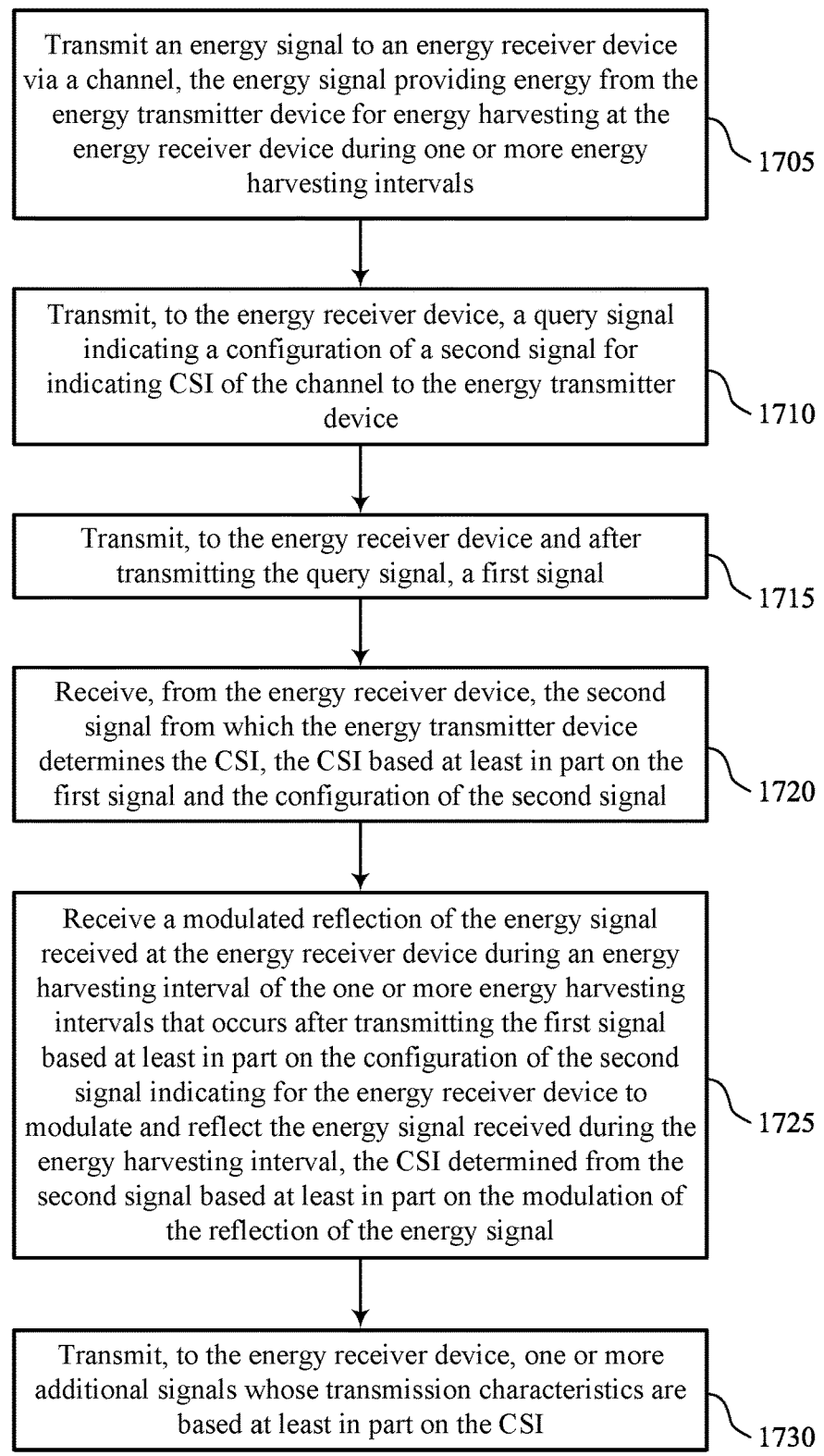

FIG. 17 shows a flowchart illustrating a method 1700 that supports techniques for communicating CSI for energy transfer operations in accordance with one or more aspects of the present disclosure. The operations of the method 1700 may be implemented by an energy transmitter device or its components as described herein. For example, the operations of the method 1700 may be performed by an energy transmitter device as described with reference to FIGS. 1 through 10. In some examples, an energy transmitter device may execute a set of instructions to control the functional elements of the energy transmitter device to perform the described functions. Additionally, or alternatively, the energy transmitter device may perform aspects of the described functions using special-purpose hardware.

At 1705, the method may include transmitting an energy signal to an energy receiver device via a channel, the energy signal providing energy from the energy transmitter device for energy harvesting at the energy receiver device during one or more energy harvesting intervals. The operations of 1705 may be performed in accordance with examples as disclosed herein. In some examples, aspects of the operations of 1705 may be performed by an energy signal component 925 as described with reference to FIG. 9.

At 1710, the method may include transmitting, to the energy receiver device, a query signal indicating a configuration of a second signal for indicating CSI of the channel to the energy transmitter device. The operations of 1710 may be performed in accordance with examples as disclosed herein. In some examples, aspects of the operations of 1710 may be performed by a query signal component 945 as described with reference to FIG. 9.

At 1715, the method may include transmitting, to the energy receiver device and after transmitting the query signal, a first signal. The operations of 1715 may be performed in accordance with examples as disclosed herein. In some examples, aspects of the operations of 1715 may be performed by a probing signal component 930 as described with reference to FIG. 9.

At 1720, the method may include receiving, from the energy receiver device, the second signal from which the energy transmitter device determines the CSI, the CSI based on the first signal and the configuration of the second signal. The operations of 1720 may be performed in accordance with examples as disclosed herein. In some examples, aspects of the operations of 1720 may be performed by a CSI component 935 as described with reference to FIG. 9.

At 1725, to receive the second signal from the energy receiver device, the method may include receiving a modulated reflection of the energy signal received at the energy receiver device during an energy harvesting interval of the one or more energy harvesting intervals that occurs after transmitting the first signal based on the configuration of the second signal indicating for the energy receiver device to modulate and reflect the energy signal received during the energy harvesting interval, the CSI determined from the second signal based on the modulation of the reflection of the energy signal. The operations of 1725 may be performed in accordance with examples as disclosed herein. In some examples, aspects of the operations of 1725 may be performed by a CSI component 935 as described with reference to FIG. 9.

At 1730, the method may include transmitting, to the energy receiver device, one or more additional signals whose transmission characteristics are based on the CSI. The operations of 1730 may be performed in accordance with examples as disclosed herein. In some examples, aspects of the operations of 1730 may be performed by a communication component 940 as described with reference to FIG. 9.

Figure 18:
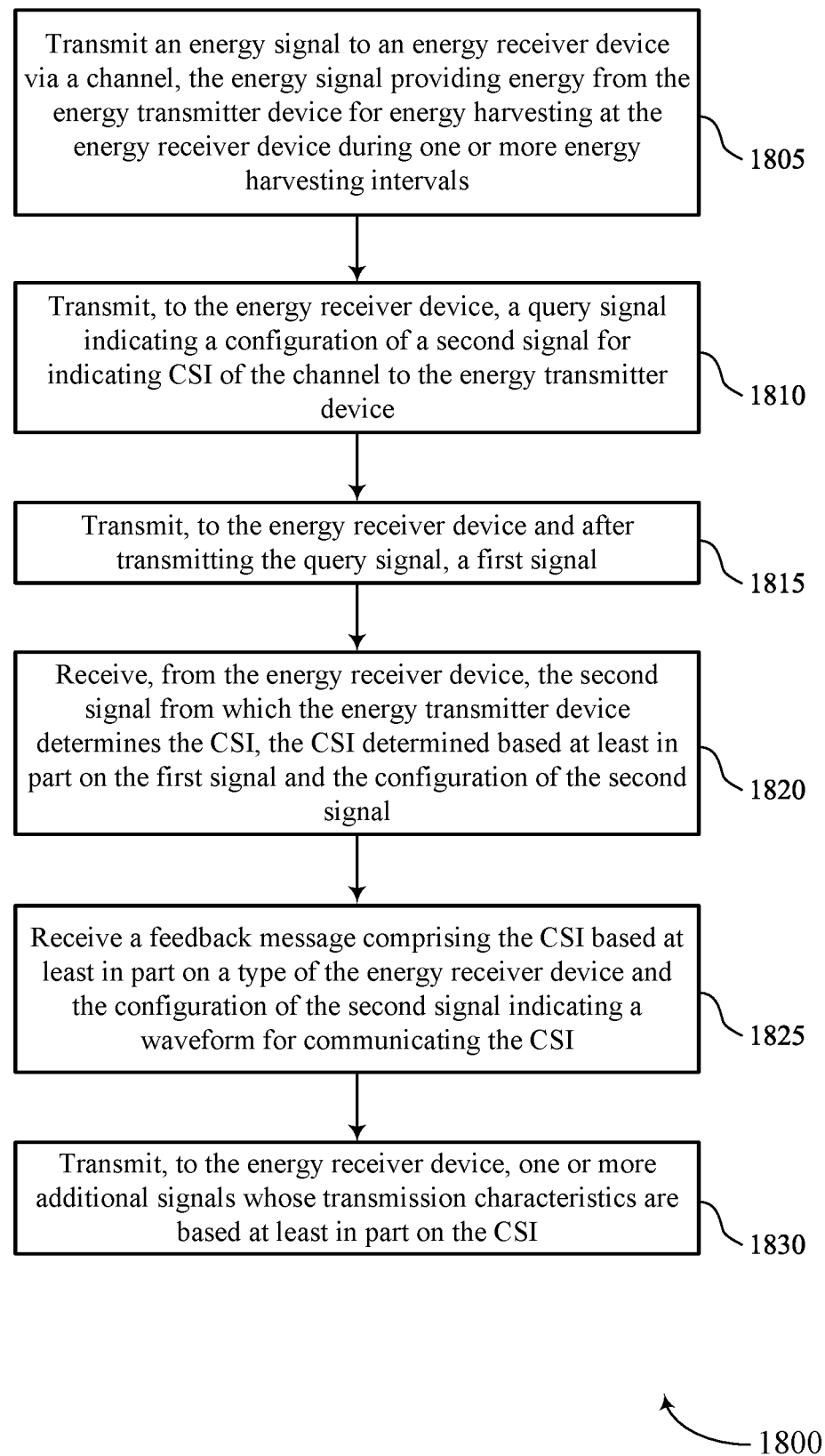

FIG. 18 shows a flowchart illustrating a method 1800 that supports techniques for communicating CSI for energy transfer operations in accordance with one or more aspects of the present disclosure. The operations of the method 1800 may be implemented by an energy transmitter device or its components as described herein. For example, the operations of the method 1800 may be performed by an energy transmitter device as described with reference to FIGS. 1 through 10. In some examples, an energy transmitter device may execute a set of instructions to control the functional elements of the energy transmitter device to perform the described functions. Additionally, or alternatively, the energy transmitter device may perform aspects of the described functions using special-purpose hardware.

At 1805, the method may include transmitting an energy signal to an energy receiver device via a channel, the energy signal providing energy from the energy transmitter device for energy harvesting at the energy receiver device during one or more energy harvesting intervals. The operations of 1805 may be performed in accordance with examples as disclosed herein. In some examples, aspects of the operations of 1805 may be performed by an energy signal component 925 as described with reference to FIG. 9.

At 1810, the method may include transmitting, to the energy receiver device, a query signal indicating a configuration of a second signal for indicating CSI of the channel to the energy transmitter device. The operations of 1810 may be performed in accordance with examples as disclosed herein. In some examples, aspects of the operations of 1810 may be performed by a query signal component 945 as described with reference to FIG. 9.

At 1815, the method may include transmitting, to the energy receiver device and after transmitting the query signal, a first signal. The operations of 1815 may be performed in accordance with examples as disclosed herein. In some examples, aspects of the operations of 1815 may be performed by a probing signal component 930 as described with reference to FIG. 9.

At 1820, the method may include receiving, from the energy receiver device, the second signal from which the energy transmitter device determines the CSI, the CSI determined based on the first signal and the configuration of the second signal. The operations of 1820 may be performed in accordance with examples as disclosed herein. In some examples, aspects of the operations of 1820 may be performed by a CSI component 935 as described with reference to FIG. 9.

At 1825, to receive the second signal from the energy receiver device, the method may include receiving a feedback message including the CSI based on a type of the energy receiver device and the configuration of the second signal indicating a waveform for communicating the CSI. The operations of 1825 may be performed in accordance with examples as disclosed herein. In some examples, aspects of the operations of 1825 may be performed by a CSI component 935 as described with reference to FIG. 9.

At 1830, the method may include transmitting, to the energy receiver device, one or more additional signals whose transmission characteristics are based on the CSI. The operations of 1830 may be performed in accordance with examples as disclosed herein. In some examples, aspects of the operations of 1830 may be performed by a communication component 940 as described with reference to FIG. 9.

Figure 19:
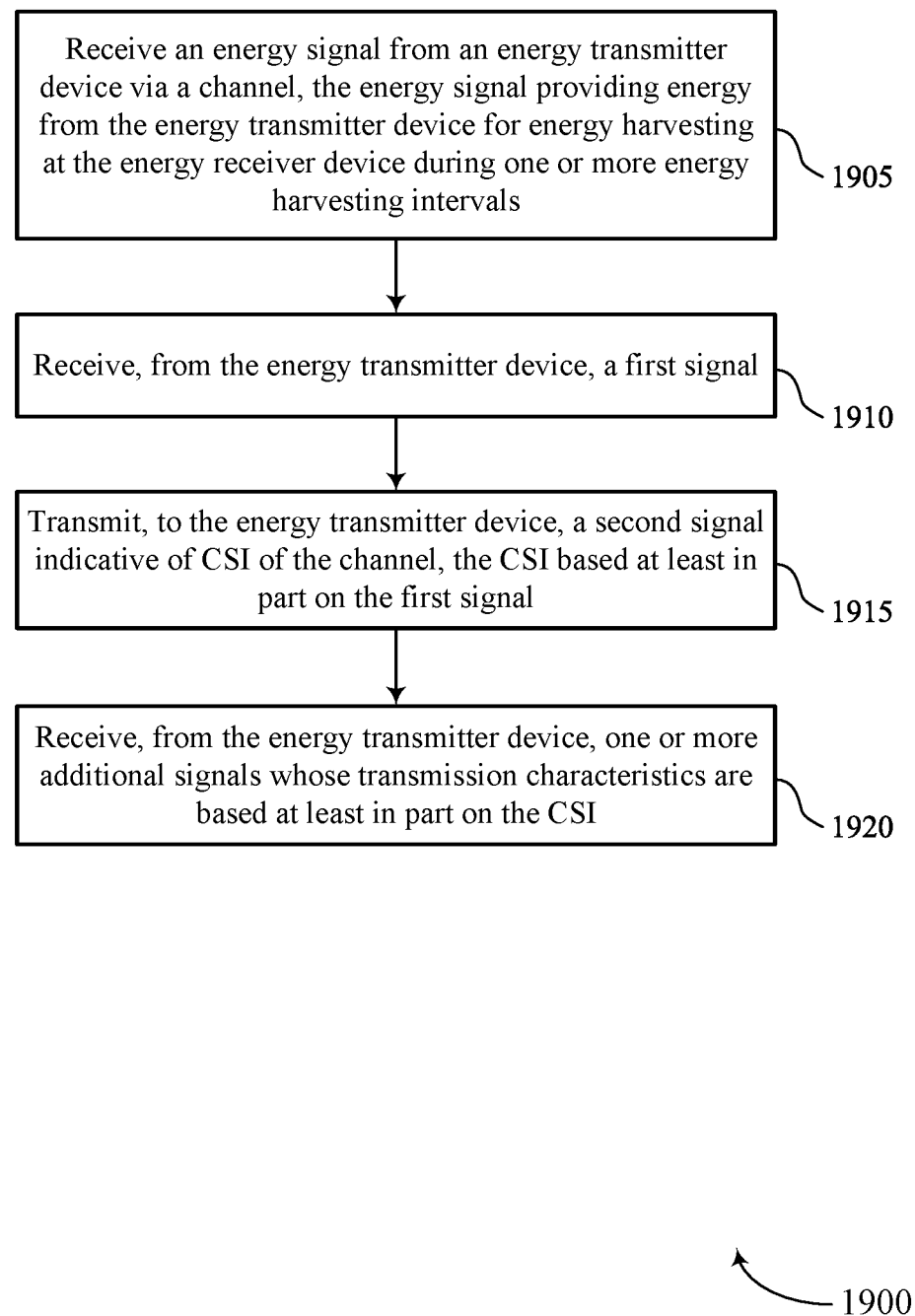

FIG. 19 shows a flowchart illustrating a method 1900 that supports techniques for communicating CSI for energy transfer operations in accordance with one or more aspects of the present disclosure. The operations of the method 1900 may be implemented by an energy receiver device or its components as described herein. For example, the operations of the method 1900 may be performed by an energy receiver device as described with reference to FIGS. 1 through 6 and 11 through 14. In some examples, an energy receiver device may execute a set of instructions to control the functional elements of the energy receiver device to perform the described functions. Additionally, or alternatively, the energy receiver device may perform aspects of the described functions using special-purpose hardware.

At 1905, the method may include receiving an energy signal from an energy transmitter device via a channel, the energy signal providing energy from the energy transmitter device for energy harvesting at the energy receiver device during one or more energy harvesting intervals. The operations of 1905 may be performed in accordance with examples as disclosed herein. In some examples, aspects of the operations of 1905 may be performed by an energy signal component 1325 as described with reference to FIG. 13.

At 1910, the method may include receiving, from the energy transmitter device, a first signal. The operations of 1910 may be performed in accordance with examples as disclosed herein. In some examples, aspects of the operations of 1910 may be performed by a probing signal component 1330 as described with reference to FIG. 13.

At 1915, the method may include transmitting, to the energy transmitter device, a second signal indicative of CSI of the channel, the CSI based on the first signal. The operations of 1915 may be performed in accordance with examples as disclosed herein. In some examples, aspects of the operations of 1915 may be performed by a CSI component 1335 as described with reference to FIG. 13.

At 1920, the method may include receiving, from the energy transmitter device, one or more additional signals whose transmission characteristics are based on the CSI. The operations of 1920 may be performed in accordance with examples as disclosed herein. In some examples, aspects of the operations of 1920 may be performed by a communication component 1340 as described with reference to FIG. 13.

Figure 20:
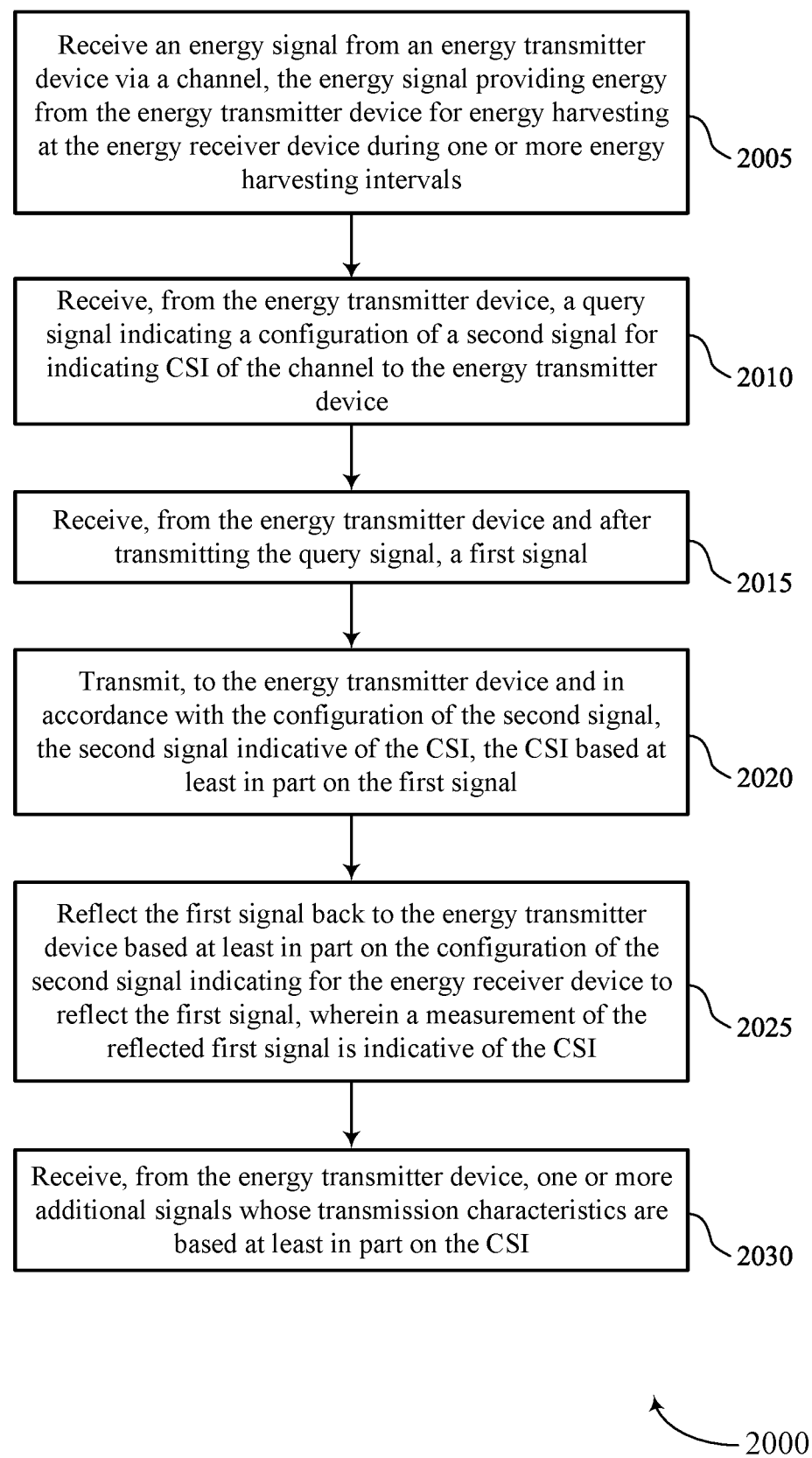

FIG. 20 shows a flowchart illustrating a method 2000 that supports techniques for communicating CSI for energy transfer operations in accordance with one or more aspects of the present disclosure. The operations of the method 2000 may be implemented by an energy receiver device or its components as described herein. For example, the operations of the method 2000 may be performed by an energy receiver device as described with reference to FIGS. 1 through 6 and 11 through 14. In some examples, an energy receiver device may execute a set of instructions to control the functional elements of the energy receiver device to perform the described functions. Additionally, or alternatively, the energy receiver device may perform aspects of the described functions using special-purpose hardware.

At 2005, the method may include receiving an energy signal from an energy transmitter device via a channel, the energy signal providing energy from the energy transmitter device for energy harvesting at the energy receiver device during one or more energy harvesting intervals. The operations of 2005 may be performed in accordance with examples as disclosed herein. In some examples, aspects of the operations of 2005 may be performed by an energy signal component 1325 as described with reference to FIG. 13.

At 2010, the method may include receiving, from the energy transmitter device, a query signal indicating a configuration of a second signal for indicating CSI of the channel to the energy transmitter device. The operations of 2010 may be performed in accordance with examples as disclosed herein. In some examples, aspects of the operations of 2010 may be performed by a query signal component 1345 as described with reference to FIG. 13.

At 2015, the method may include receiving, from the energy transmitter device and after receiving the query signal, a first signal. The operations of 2015 may be performed in accordance with examples as disclosed herein. In some examples, aspects of the operations of 2015 may be performed by a probing signal component 1330 as described with reference to FIG. 13.

At 2020, the method may include transmitting, to the energy transmitter device and in accordance with the configuration of the second signal, the second signal indicative of the CSI, the CSI based on the first signal. The operations of 2020 may be performed in accordance with examples as disclosed herein. In some examples, aspects of the operations of 2020 may be performed by a CSI component 1335 as described with reference to FIG. 13.

At 2025, to transmit the second signal to the energy transmitter device, the method may include reflecting the first signal back to the energy transmitter device based on the configuration of the second signal indicating for the energy receiver device to reflect the first signal, where a measurement of the reflected first signal is indicative of the CSI. The operations of 2025 may be performed in accordance with examples as disclosed herein. In some examples, aspects of the operations of 2025 may be performed by a CSI component 1335 as described with reference to FIG. 13.

At 2030, the method may include receiving, from the energy transmitter device, one or more additional signals whose transmission characteristics are based on the CSI. The operations of 2030 may be performed in accordance with examples as disclosed herein. In some examples, aspects of the operations of 2030 may be performed by a communication component 1340 as described with reference to FIG. 13.

Figure 21:
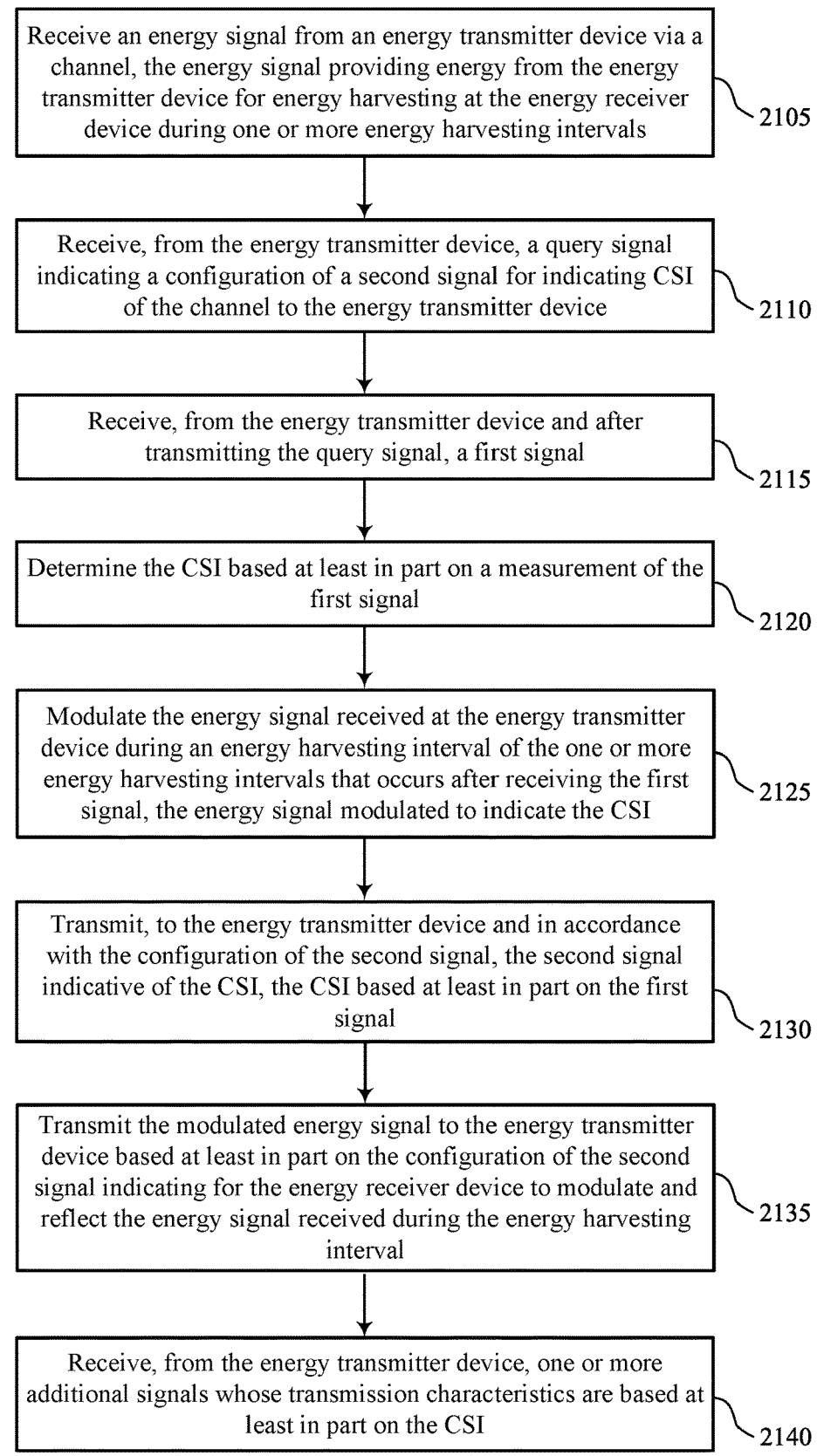

FIG. 21 shows a flowchart illustrating a method 2100 that supports techniques for communicating CSI for energy transfer operations in accordance with one or more aspects of the present disclosure. The operations of the method 2100 may be implemented by an energy receiver device or its components as described herein. For example, the operations of the method 2100 may be performed by an energy receiver device as described with reference to FIGS. 1 through 6 and 11 through 14. In some examples, an energy receiver device may execute a set of instructions to control the functional elements of the energy receiver device to perform the described functions. Additionally, or alternatively, the energy receiver device may perform aspects of the described functions using special-purpose hardware.

At 2105, the method may include receiving an energy signal from an energy transmitter device via a channel, the energy signal providing energy from the energy transmitter device for energy harvesting at the energy receiver device during one or more energy harvesting intervals. The operations of 2105 may be performed in accordance with examples as disclosed herein. In some examples, aspects of the operations of 2105 may be performed by an energy signal component 1325 as described with reference to FIG. 13.

At 2110, the method may include receiving, from the energy transmitter device, a query signal indicating a configuration of a second signal for indicating CSI of the channel to the energy transmitter device. The operations of 2110 may be performed in accordance with examples as disclosed herein. In some examples, aspects of the operations of 2110 may be performed by a query signal component 1345 as described with reference to FIG. 13.

At 2115, the method may include receiving, from the energy transmitter device and after receiving the query signal, a first signal. The operations of 2115 may be performed in accordance with examples as disclosed herein. In some examples, aspects of the operations of 2115 may be performed by a probing signal component 1330 as described with reference to FIG. 13.

At 2120, the method may include determining the CSI based on a measurement of the first signal. The operations of 2120 may be performed in accordance with examples as disclosed herein. In some examples, aspects of the operations of 2120 may be performed by a CSI component 1335 as described with reference to FIG. 13.

At 2125, the method may include modulating the energy signal received at the energy transmitter device during an energy harvesting interval of the one or more energy harvesting intervals that occurs after receiving the first signal, the energy signal modulated to indicate the CSI. The operations of 2125 may be performed in accordance with examples as disclosed herein. In some examples, aspects of the operations of 2125 may be performed by a CSI component 1335 as described with reference to FIG. 13.

At 2130, the method may include transmitting, to the energy transmitter device and in accordance with the configuration of the second signal, the second signal indicative of the CSI, the CSI based on the first signal. The operations of 2130 may be performed in accordance with examples as disclosed herein. In some examples, aspects of the operations of 2130 may be performed by a CSI component 1335 as described with reference to FIG. 13.

At 2135, to transmit the second signal to the energy transmitter device, the method may include transmitting the modulated energy signal to the energy transmitter device based on the configuration of the second signal indicating for the energy receiver device to modulate and reflect the energy signal received during the energy harvesting interval. The operations of 2135 may be performed in accordance with examples as disclosed herein. In some examples, aspects of the operations of 2135 may be performed by a CSI component 1335 as described with reference to FIG. 13

At 2140, the method may include receiving, from the energy transmitter device, one or more additional signals whose transmission characteristics are based on the CSI. The operations of 2140 may be performed in accordance with examples as disclosed herein. In some examples, aspects of the operations of 2140 may be performed by a communication component 1340 as described with reference to FIG. 13.

Figure 22:
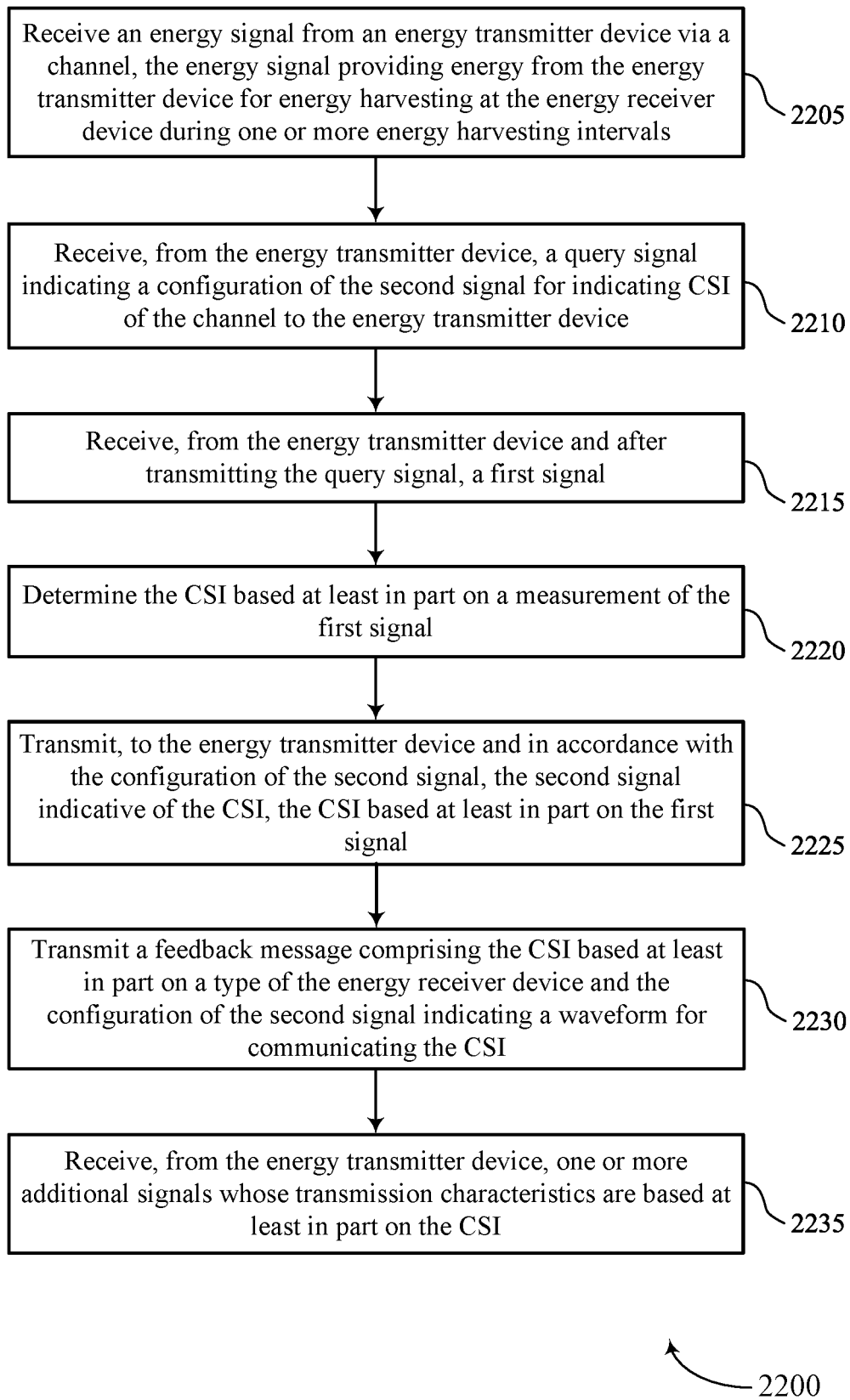

FIG. 22 shows a flowchart illustrating a method 2200 that supports techniques for communicating CSI for energy transfer operations in accordance with one or more aspects of the present disclosure. The operations of the method 2200 may be implemented by an energy receiver device or its components as described herein. For example, the operations of the method 2200 may be performed by an energy receiver device as described with reference to FIGS. 1 through 6 and 11 through 14. In some examples, an energy receiver device may execute a set of instructions to control the functional elements of the energy receiver device to perform the described functions. Additionally, or alternatively, the energy receiver device may perform aspects of the described functions using special-purpose hardware.

At 2205, the method may include receiving an energy signal from an energy transmitter device via a channel, the energy signal providing energy from the energy transmitter device for energy harvesting at the energy receiver device during one or more energy harvesting intervals. The operations of 2205 may be performed in accordance with examples as disclosed herein. In some examples, aspects of the operations of 2205 may be performed by an energy signal component 1325 as described with reference to FIG. 13.

At 2210, the method may include receiving, from the energy transmitter device, a query signal indicating a configuration of the second signal for indicating CSI of the channel to the energy transmitter device. The operations of 2210 may be performed in accordance with examples as disclosed herein. In some examples, aspects of the operations of 2210 may be performed by a query signal component 1345 as described with reference to FIG. 13.

At 2215, the method may include receiving, from the energy transmitter device and after receiving the query signal, a first signal. The operations of 2215 may be performed in accordance with examples as disclosed herein. In some examples, aspects of the operations of 2215 may be performed by a probing signal component 1330 as described with reference to FIG. 13.

At 2220, the method may include determining the CSI based on a measurement of the first signal. The operations of 2220 may be performed in accordance with examples as disclosed herein. In some examples, aspects of the operations of 2220 may be performed by a CSI component 1335 as described with reference to FIG. 13.

At 2225, the method may include transmitting, to the energy transmitter device and in accordance with the configuration of the second signal, the second signal indicative of the CSI, the CSI based on the first signal. The operations of 2225 may be performed in accordance with examples as disclosed herein. In some examples, aspects of the operations of 2225 may be performed by a CSI component 1335 as described with reference to FIG. 13.

At 2230, to transmit the second signal to the energy transmitter device, the method may include transmitting a feedback message including the CSI based on a type of the energy receiver device and the configuration of the second signal indicating a waveform for communicating the CSI. The operations of 2230 may be performed in accordance with examples as disclosed herein. In some examples, aspects of the operations of 2230 may be performed by a CSI component 1335 as described with reference to FIG. 13.

At 2235, the method may include receiving, from the energy transmitter device, one or more additional signals whose transmission characteristics are based on the CSI. The operations of 2235 may be performed in accordance with examples as disclosed herein. In some examples, aspects of the operations of 2235 may be performed by a communication component 1340 as described with reference to FIG. 13.

The following provides an overview of aspects of the present disclosure:

Aspect 1: A method for wireless communication at an energy transmitter device, comprising: transmitting an energy signal to an energy receiver device via a channel, the energy signal providing energy from the energy transmitter device for energy harvesting at the energy receiver device during one or more energy harvesting intervals; transmitting, to the energy receiver device, a first signal; receiving, from the energy receiver device, a second signal from which the energy transmitter device determines CSI of the channel, the CSI based at least in part on the first signal; and transmitting, to the energy receiver device, one or more additional signals whose transmission characteristics are based at least in part on the CSI.

Aspect 2: The method of aspect 1, further comprising: transmitting, to the energy receiver device and before transmitting the first signal, a query signal indicating a configuration of the second signal for indicating the CSI to the energy transmitter device, wherein the CSI is determined based at least in part on the configuration of the second signal.

Aspect 3: The method of aspect 2, wherein receiving the second signal further comprises: receiving a reflection of the first signal received at the energy receiver device based at least in part on the configuration of the second signal indicating for the energy receiver device to reflect the first signal, the CSI determined from the second signal based at least in part on a measurement of the reflection.

Aspect 4: The method of aspect 2, wherein receiving the second signal further comprises: receiving a modulated reflection of the energy signal received at the energy receiver device during an energy harvesting interval of the one or more energy harvesting intervals that occurs after transmitting the first signal based at least in part on the configuration of the second signal indicating for the energy receiver device to modulate and reflect the energy signal received during the energy harvesting interval, the CSI determined from the second signal based at least in part on the modulation of the reflection of the energy signal.

Aspect 5: The method of aspect 2, wherein receiving the second signal further comprises: receiving a feedback message comprising the CSI based at least in part on a type of the energy receiver device and the configuration of the second signal indicating a waveform for communicating the CSI.

Aspect 6: The method of any of aspects 2 through 5, wherein the query signal indicates that the energy receiver device is to communicate the CSI with the energy transmitter device, and the first signal is transmitted to the energy receiver device and the second signal is received from the energy receiver device based at least in part on transmitting the query signal.

Aspect 7: The method of any of aspects 2 through 6, wherein the first signal is transmitted after an energy harvesting interval of the one or more energy harvesting intervals that occurs after transmitting the query signal.

Aspect 8: The method of any of aspects 1 through 7, further comprising: transmitting, to a set of energy receiver devices comprising the energy receiver device and before transmitting the first signal, a select signal indicating that the set of energy receiver devices is to communicate respective CSI with the energy transmitter device via respective channels, wherein the first signal is transmitted to the energy receiver device and the second signal is received from the energy receiver device based at least in part on transmitting the select signal.

Aspect 9: The method of aspect 8, further comprising: transmitting, to the energy receiver device, a query signal that indicates a configuration of the second signal for indicating the CSI to the energy transmitter device, wherein the select signal is transmitted before an energy harvesting interval of the one or more energy harvesting intervals that occurs before transmitting the query signal.

Aspect 10: The method of any of aspects 1 through 9, wherein transmitting the one or more additional signals comprises transmitting a third signal, the method further comprising: receiving, from the energy receiver device, a fourth signal from which the energy transmitter device determines second CSI of the channel, the second CSI based at least in part on the third signal.

Aspect 11: The method of aspect 10, wherein the third signal is transmitted after a configured time interval for processing the second signal at the energy transmitter device.

Aspect 12: The method of any of aspects 1 through 11, wherein transmitting the one or more additional signals comprises: transmitting, to the energy receiver device, a query signal indicating for the energy receiver device to communicate second CSI of the channel with the energy transmitter device.

Aspect 13: The method of aspect 12, wherein the query signal is transmitted after an energy harvesting interval of the one or more energy harvesting intervals that occurs after receiving the second signal.

Aspect 14: The method of any of aspects 1 through 13, wherein transmitting the one or more additional signals comprises: transmitting the one or more additional signals using a beam whose parameters are based at least in part on the CSI, a set of precoding parameters that are based at least in part on the CSI, or both.

Aspect 15: A method for wireless communication at an energy receiver device, comprising: receiving an energy signal from an energy transmitter device via a channel, the energy signal providing energy from the energy transmitter device for energy harvesting at the energy receiver device during one or more energy harvesting intervals; receiving, from the energy transmitter device, a first signal; transmitting, to the energy transmitter device, a second signal indicative of CSI of the channel, the CSI based at least in part on the first signal; and receiving, from the energy transmitter device, one or more additional signals whose transmission characteristics are based at least in part on the CSI.

Aspect 16: The method of aspect 15, further comprising: receiving, from the energy transmitter device and before receiving the first signal, a query signal indicating a configuration of the second signal for indicating the CSI to the energy transmitter device, wherein the second signal is transmitted in accordance with the configuration of the second signal.

Aspect 17: The method of aspect 16, wherein transmitting the second signal to the energy transmitter device comprises: reflecting the first signal back to the energy transmitter device based at least in part on the configuration of the second signal indicating for the energy receiver device to reflect the first signal, wherein a measurement of the reflected first signal is indicative of the CSI.

Aspect 18: The method of aspect 16, further comprising: determining the CSI based at least in part on a measurement of the first signal; and modulating the energy signal received at the energy transmitter device during an energy harvesting interval of the one or more energy harvesting intervals that occurs after receiving the first signal, the energy signal modulated to indicate the CSI, wherein transmitting the second signal to the energy transmitter device comprises: transmitting the modulated energy signal to the energy transmitter device based at least in part on the configuration of the second signal indicating for the energy receiver device to modulate and reflect the energy signal received during the energy harvesting interval.

Aspect 19: The method of aspect 16, further comprising: determining the CSI based at least in part on a measurement of the first signal, wherein transmitting the second signal to the energy transmitter device comprises: transmitting a feedback message comprising the CSI based at least in part on a type of the energy receiver device and the configuration of the second signal indicating a waveform for communicating the CSI.

Aspect 20: The method of any of aspects 16 through 19, wherein the query signal indicates that the energy receiver device is to communicate the CSI with the energy transmitter device, and the first signal is received from the energy transmitter device and the second signal is transmitted to the energy transmitter device based at least in part on receiving the query signal.

Aspect 21: The method of any of aspects 16 through 20, wherein the first signal is received after an energy harvesting interval of the one or more energy harvesting intervals that occurs after receiving the query signal.

Aspect 22: The method of any of aspects 15 through 21, further comprising: receiving, from the energy transmitter device and before receiving the first signal, a select signal indicating that a set of energy receiver devices is to communicate respective CSI with the energy transmitter device via respective channels, the set of energy receiver devices comprising the energy receiver device, wherein the first signal is received from the energy transmitter device and the second signal is transmitted to the energy transmitter device based at least in part on receiving the select signal.

Aspect 23: The method of aspect 22, further comprising: receiving, from the energy transmitter device, a query signal that indicates a configuration of the second signal for indicating the CSI to the energy transmitter device, wherein the select signal is received before an energy harvesting interval of the one or more energy harvesting intervals that occurs before receiving the query signal.

Aspect 24: The method of any of aspects 15 through 23, wherein the second signal is transmitted after a configured time interval for processing the first signal at the energy receiver device.

Aspect 25: The method of any of aspects 15 through 24, wherein receiving the one or more additional signals comprises receiving a third signal, the method further comprising: transmitting, to the energy transmitter device, a fourth signal indicative of second CSI of the channel, the second CSI based at least in part on the third signal.

Aspect 26: The method of any of aspects 15 through 25, wherein receiving the one or more additional signals comprises: receiving, from the energy transmitter device, a query signal indicating for the energy receiver device to communicate second CSI of the channel with the energy transmitter device.

Aspect 27: The method of aspect 26, wherein the query signal is received after an energy harvesting interval of the one or more energy harvesting intervals that occurs after transmitting the second signal.

Aspect 28: The method of any of aspects 15 through 27, wherein receiving the one or more additional signals comprises: receiving the one or more additional signals using a beam whose parameters are based at least in part on the CSI.

Aspect 29: An apparatus for wireless communication at an energy transmitter device, comprising a processor; memory coupled with the processor; and instructions stored in the memory and executable by the processor to cause the apparatus to perform a method of any of aspects 1 through 14.

Aspect 30: An apparatus for wireless communication at an energy transmitter device, comprising at least one means for performing a method of any of aspects 1 through 14.

Aspect 31: A non-transitory computer-readable medium storing code for wireless communication at an energy transmitter device, the code comprising instructions executable by a processor to perform a method of any of aspects 1 through 14.

Aspect 32: An apparatus for wireless communication at an energy receiver device, comprising a processor; memory coupled with the processor; and instructions stored in the memory and executable by the processor to cause the apparatus to perform a method of any of aspects 15 through 28.

Aspect 33: An apparatus for wireless communication at an energy receiver device, comprising at least one means for performing a method of any of aspects 15 through 28.

Aspect 34: A non-transitory computer-readable medium storing code for wireless communication at an energy receiver device, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at an energy transmitter device, comprising:
transmitting an energy signal to an energy receiver device via a channel, the energy signal providing energy from the energy transmitter device for energy harvesting at the energy receiver device during one or more energy harvesting intervals;
transmitting, to the energy receiver device, a first signal separate from the energy signal;
receiving, from the energy receiver device, a second signal from which the energy transmitter device determines channel state information of the channel, the channel state information based at least in part on the first signal; and
transmitting, to the energy receiver device, one or more additional signals whose transmission characteristics are based at least in part on the channel state information.

2. The method of claim 1, further comprising:
transmitting, to the energy receiver device and before transmitting the first signal, a query signal indicating a configuration of the second signal for indicating the channel state information to the energy transmitter device,
wherein the channel state information is determined based at least in part on the configuration of the second signal.

3. The method of claim 2, wherein receiving the second signal further comprises:
receiving a reflection of the first signal received at the energy receiver device based at least in part on the configuration of the second signal indicating for the energy receiver device to reflect the first signal, the channel state information determined from the second signal based at least in part on a measurement of the reflection.

4. The method of claim 2, wherein receiving the second signal further comprises:
receiving a modulated reflection of the energy signal received at the energy receiver device during an energy harvesting interval of the one or more energy harvesting intervals that occurs after transmitting the first signal based at least in part on the configuration of the second signal indicating for the energy receiver device to modulate and reflect the energy signal received during the energy harvesting interval, the channel state information determined from the second signal based at least in part on the modulation of the reflection of the energy signal.

5. The method of claim 2, wherein receiving the second signal further comprises:
receiving a feedback message comprising the channel state information based at least in part on a type of the energy receiver device and the configuration of the second signal indicating a waveform for communicating the channel state information.

6. The method of claim 2, wherein the query signal indicates that the energy receiver device is to communicate the channel state information with the energy transmitter device, and wherein the first signal is transmitted to the energy receiver device and the second signal is received from the energy receiver device based at least in part on transmitting the query signal.

7. The method of claim 2, wherein the first signal is transmitted after an energy harvesting interval of the one or more energy harvesting intervals that occurs after transmitting the query signal.

8. The method of claim 1, further comprising:
transmitting, to a set of energy receiver devices comprising the energy receiver device and before transmitting the first signal, a select signal indicating that the set of energy receiver devices is to communicate respective channel state information with the energy transmitter device via respective channels,
wherein the first signal is transmitted to the energy receiver device and the second signal is received from the energy receiver device based at least in part on transmitting the select signal.

9. The method of claim 8, further comprising:
transmitting, to the energy receiver device, a query signal that indicates a configuration of the second signal for indicating the channel state information to the energy transmitter device, wherein the select signal is transmitted before an energy harvesting interval of the one or more energy harvesting intervals that occurs before transmitting the query signal.

10. The method of claim 1, wherein transmitting the one or more additional signals comprises transmitting a third signal, the method further comprising:
receiving, from the energy receiver device, a fourth signal from which the energy transmitter device determines second channel state information of the channel, the second channel state information based at least in part on the third signal.

11. The method of claim 10, wherein the third signal is transmitted after a configured time interval for processing the second signal at the energy transmitter device.

12. The method of claim 1, wherein transmitting the one or more additional signals comprises:
transmitting, to the energy receiver device, a query signal indicating for the energy receiver device to communicate second channel state information of the channel with the energy transmitter device.

13. The method of claim 12, wherein the query signal is transmitted after an energy harvesting interval of the one or more energy harvesting intervals that occurs after receiving the second signal.

14. The method of claim 1, wherein transmitting the one or more additional signals comprises:
transmitting the one or more additional signals using a beam whose parameters are based at least in part on the channel state information, a set of pre-coding parameters that are based at least in part on the channel state information, or both.

15. A method for wireless communication at an energy receiver device, comprising:
receiving an energy signal from an energy transmitter device via a channel, the energy signal providing energy from the energy transmitter device for energy harvesting at the energy receiver device during one or more energy harvesting intervals;
receiving, from the energy transmitter device, a first signal separate from the energy signal;
transmitting, to the energy transmitter device, a second signal indicative of channel state information of the channel, the channel state information based at least in part on the first signal; and receiving, from the energy transmitter device, one or more additional signals whose transmission characteristics are based at least in part on the channel state information.

16. The method of claim 15, further comprising:
receiving, from the energy transmitter device and before receiving the first signal, a query signal indicating a configuration of the second signal for indicating the channel state information to the energy transmitter device,
wherein the second signal is transmitted in accordance with the configuration of the second signal.

17. The method of claim 16, wherein transmitting the second signal to the energy transmitter device comprises:
reflecting the first signal back to the energy transmitter device based at least in part on the configuration of the second signal indicating for the energy receiver device to reflect the first signal, wherein a measurement of the reflected first signal is indicative of the channel state information.

18. The method of claim 16, further comprising:
determining the channel state information based at least in part on a measurement of the first signal; and
modulating the energy signal received at the energy transmitter device during an energy harvesting interval of the one or more energy harvesting intervals that occurs after receiving the first signal, the energy signal modulated to indicate the channel state information, wherein transmitting the second signal to the energy transmitter device comprises:
transmitting the modulated energy signal to the energy transmitter device based at least in part on the configuration of the second signal indicating for the energy receiver device to modulate and reflect the energy signal received during the energy harvesting interval.

19. The method of claim 16, further comprising:
determining the channel state information based at least in part on a measurement of the first signal, wherein transmitting the second signal to the energy transmitter device comprises:
transmitting a feedback message comprising the channel state information based at least in part on a type of the energy receiver device and the configuration of the second signal indicating a waveform for communicating the channel state information.

20. The method of claim 16, wherein the query signal indicates that the energy receiver device is to communicate the channel state information with the energy transmitter device, and wherein the first signal is received from the energy transmitter device and the second signal is transmitted to the energy transmitter device based at least in part on receiving the query signal.

21. The method of claim 16, wherein the first signal is received after an energy harvesting interval of the one or more energy harvesting intervals that occurs after receiving the query signal.

22. The method of claim 15, further comprising:
receiving, from the energy transmitter device and before receiving the first signal, a select signal indicating that a set of energy receiver devices is to communicate respective channel state information with the energy transmitter device via respective channels, the set of energy receiver devices comprising the energy receiver device,
wherein the first signal is received from the energy transmitter device and the second signal is transmitted to the energy transmitter device based at least in part on receiving the select signal.

23. The method of claim 22, further comprising:
receiving, from the energy transmitter device, a query signal that indicates a configuration of the second signal for indicating the channel state information to the energy transmitter device, wherein the select signal is received before an energy harvesting interval of the one or more energy harvesting intervals that occurs before receiving the query signal.

24. The method of claim 15, wherein the second signal is transmitted after a configured time interval for processing the first signal at the energy receiver device.

25. The method of claim 15, wherein receiving the one or more additional signals comprises receiving a third signal, the method further comprising:
transmitting, to the energy transmitter device, a fourth signal indicative of second channel state information of the channel, the second channel state information based at least in part on the third signal.

26. The method of claim 15, wherein receiving the one or more additional signals comprises:
receiving, from the energy transmitter device, a query signal indicating for the energy receiver device to communicate second channel state information of the channel with the energy transmitter device.

27. The method of claim 26, wherein the query signal is received after an energy harvesting interval of the one or more energy harvesting intervals that occurs after transmitting the second signal.

28. The method of claim 15, wherein receiving the one or more additional signals comprises:
receiving the one or more additional signals using a beam whose parameters are based at least in part on the channel state information.

29. An apparatus for wireless communication at an energy transmitter device, comprising:
a processor;
memory coupled with the processor; and
instructions stored in the memory and executable by the processor to cause the apparatus to:
transmit an energy signal to an energy receiver device via a channel, the energy signal providing energy from the energy transmitter device for energy harvesting at the energy receiver device during one or more energy harvesting intervals;
transmit, to the energy receiver device, a first signal separate from the energy signal;
receive, from the energy receiver device, a second signal from which the energy transmitter device determines channel state information of the channel, the channel state information based at least in part on the first signal; and
transmit, to the energy receiver device, one or more additional signals whose transmission characteristics are based at least in part on the channel state information.

30. An apparatus for wireless communication at an energy receiver device, comprising:
a processor;
memory coupled with the processor; and
instructions stored in the memory and executable by the processor to cause the apparatus to:
receive an energy signal from an energy transmitter device via a channel, the energy signal providing energy from the energy transmitter device for energy harvesting at the energy receiver device during one or more energy harvesting intervals;

receive, from the energy transmitter device, a first signal separate from the energy signal;

transmit, to the energy transmitter device, a second signal indicative of channel state information of the channel, the channel state information based at least in part on the first signal; and receive, from the energy transmitter device, one or more additional signals whose transmission characteristics are based at least in part on the channel state information.

\* \* \* \* \*